US011667026B2

(12) United States Patent
Jones et al.

(10) Patent No.: US 11,667,026 B2
(45) Date of Patent: Jun. 6, 2023

(54) BATTERY PACK WITH LANYARD RECEIVER AND TETHER WITH QUICK ATTACHMENT

(71) Applicant: Milwaukee Electric Tool Corporation, Brookfield, WI (US)

(72) Inventors: Benjamin T. Jones, St. Francis, WI (US); Grant T. Squiers, Cudahy, WI (US); Emelie E. Troedson, New Berlin, WI (US); Christopher S. Hoppe, Milwaukee, WI (US); Steven W. Hyma, Milwaukee, WI (US); Kyle Reeder, Waukesha, WI (US); Anthony S. Graykowski, Belgium, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 348 days.

(21) Appl. No.: 16/828,519

(22) Filed: Mar. 24, 2020

(65) Prior Publication Data
US 2020/0227695 A1 Jul. 16, 2020

Related U.S. Application Data

(63) Continuation of application No. PCT/US2018/052466, filed on Sep. 24, 2018.
(Continued)

(51) Int. Cl.
*H01M 10/0525* (2010.01)
*B25F 5/02* (2006.01)
(Continued)

(52) U.S. Cl.
CPC ........... *B25F 5/02* (2013.01); *H01M 10/0525* (2013.01); *H01M 50/202* (2021.01);
(Continued)

(58) Field of Classification Search
CPC ............ H01M 50/20; H01M 10/0525; H01M 2220/30; H01M 10/4257; B25F 5/02; H02J 7/0048; H02J 7/0049; Y02E 60/10
See application file for complete search history.

(56) References Cited

U.S. PATENT DOCUMENTS

| 3,165,059 A | 1/1965 | Saunders |
| 6,059,213 A | 5/2000 | Phillips |

(Continued)

FOREIGN PATENT DOCUMENTS

| CN | 103703651 | 4/2014 |
| CN | 207856105 | 9/2018 |

(Continued)

OTHER PUBLICATIONS

International Search Report and Written Opinion for International Application No. PCT/US2018/052466 dated Mar. 21, 2019, 12 pages.

*Primary Examiner* — Michael L Dignan
(74) *Attorney, Agent, or Firm* — Reinhart Boerner Van Deuren s.c.

(57) ABSTRACT

A battery tether system for tethering a power tool battery is provided. The battery may include a tether receiver as an integral component of the battery or the battery may be retrofit with a sleeve or bumper including a tether receiver. The sleeve may include a clasp to overlay the retrofit battery and ensure that the tether receptacle remains coupled to the battery. The tether receiver may connect to the tool receiver and provide an electrical connection to the tool and a tether receiver for the battery. The battery system may include tether keys configured to be inserted into a slot and slide into a locking pocket of the sleeve or bumper.

7 Claims, 23 Drawing Sheets

Related U.S. Application Data

(60) Provisional application No. 62/726,751, filed on Sep. 4, 2018, provisional application No. 62/671,141, filed on May 14, 2018, provisional application No. 62/562,763, filed on Sep. 25, 2017.

(51) Int. Cl.
*H02J 7/00* (2006.01)
*H01M 50/264* (2021.01)
*H01M 50/247* (2021.01)
*H01M 50/202* (2021.01)
*H01M 50/296* (2021.01)

(52) U.S. Cl.
CPC ....... *H01M 50/247* (2021.01); *H01M 50/264* (2021.01); *H01M 50/296* (2021.01); *H02J 7/0048* (2020.01); *H01M 2220/30* (2013.01); *H02J 7/0049* (2020.01)

(56) References Cited

U.S. PATENT DOCUMENTS

| | | | |
|---|---|---|---|
| 6,179,238 B1 | 1/2001 | Phillips | |
| 6,536,697 B2 | 3/2003 | Tsan | |
| 7,374,123 B2 | 5/2008 | Han | |
| 7,424,997 B2 | 9/2008 | Achtari et al. | |
| 7,458,488 B2 | 12/2008 | Bass et al. | |
| 7,857,099 B2 | 12/2010 | Choate | |
| 8,627,549 B2 | 1/2014 | Vernieu | |
| 8,746,519 B2 | 6/2014 | Paugh et al. | |
| 9,169,972 B2 | 10/2015 | Hesl et al. | |
| 9,242,128 B2 | 1/2016 | Macy | |
| 10,021,958 B2 | 7/2018 | Votel et al. | |
| 2005/0045676 A1 | 3/2005 | Bass et al. | |
| 2006/0283081 A1 | 12/2006 | Killen | |
| 2007/0114141 A1* | 5/2007 | Mikesell | B25H 3/006 206/207 |
| 2008/0105779 A1 | 5/2008 | Han | |
| 2008/0148530 A1 | 6/2008 | Conti | |
| 2009/0084697 A1 | 4/2009 | Gross | |
| 2009/0242595 A1 | 10/2009 | Gross | |
| 2009/0251149 A1* | 10/2009 | Buckner | G01R 31/385 324/426 |
| 2010/0116922 A1 | 5/2010 | Choate et al. | |
| 2010/0206922 A1 | 8/2010 | Gross | |
| 2011/0133496 A1* | 6/2011 | Cooper | B25F 5/02 292/341.15 |
| 2012/0189892 A1 | 7/2012 | Gilgen | |
| 2014/0159919 A1* | 6/2014 | Furui | B25F 3/00 340/870.07 |
| 2014/0318821 A1* | 10/2014 | Wyler | B25F 5/006 173/104 |
| 2014/0329119 A1* | 11/2014 | Tirone | H01M 50/20 429/96 |
| 2015/0157116 A1 | 6/2015 | Williams | |
| 2015/0321813 A1 | 11/2015 | Iannello et al. | |
| 2017/0258210 A1 | 9/2017 | Moreau et al. | |
| 2018/0040927 A1* | 2/2018 | Rejman | B25F 5/02 |
| 2019/0091495 A1 | 3/2019 | Zwart | |

FOREIGN PATENT DOCUMENTS

| | | | |
|---|---|---|---|
| DE | 1938245 | 5/1966 | |
| DE | 3323716 | 5/1984 | |
| DE | 29903185 | 5/1999 | |
| DE | 102008060709 | * 6/2010 | ............... B69S 5/06 |
| EP | 0193253 | 9/1989 | |
| WO | WO07116202 | 10/2007 | |
| WO | WO10081202 | 7/2010 | |
| WO | WO2014/142753 | 9/2014 | |
| WO | WO18140356 | 8/2018 | |

* cited by examiner

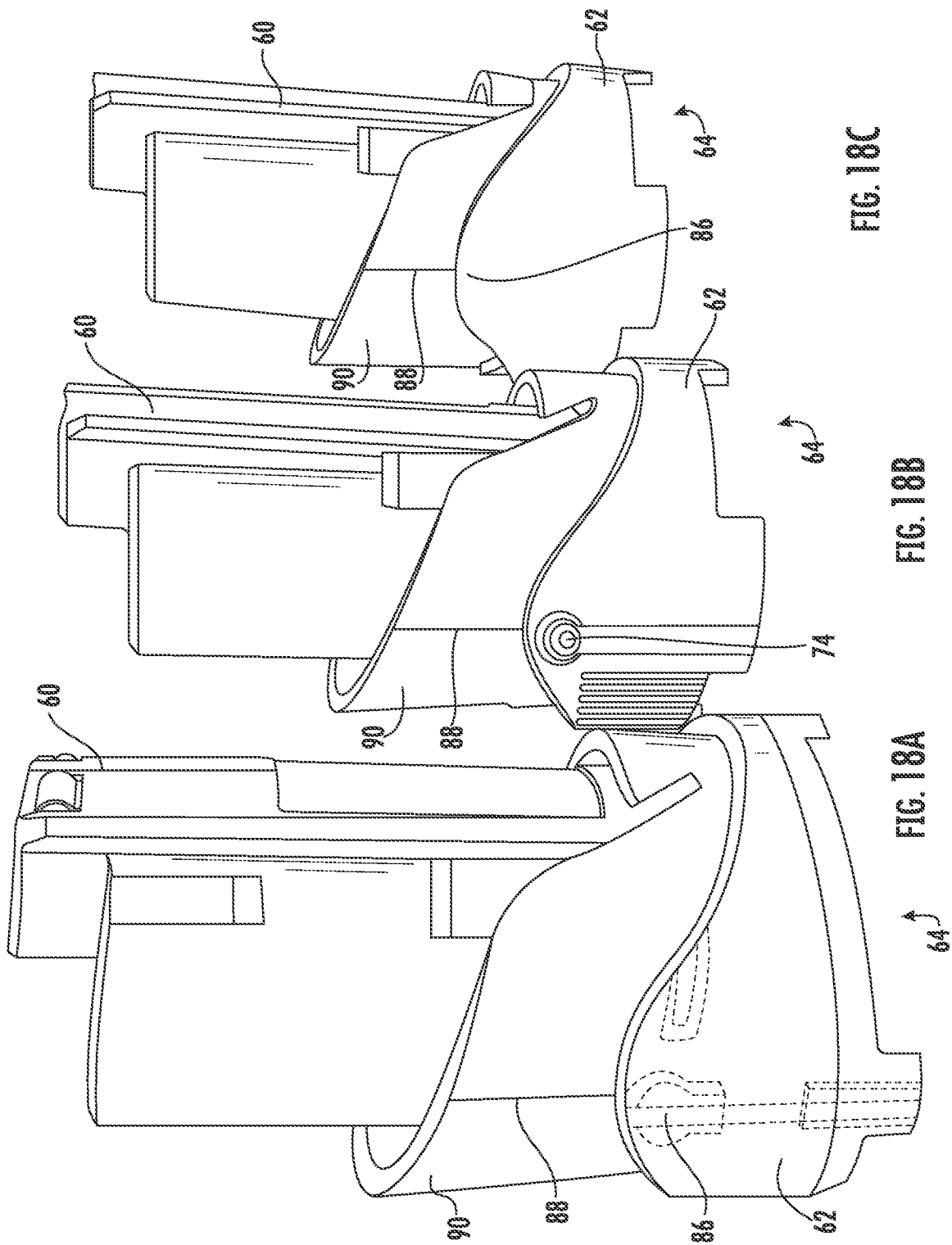

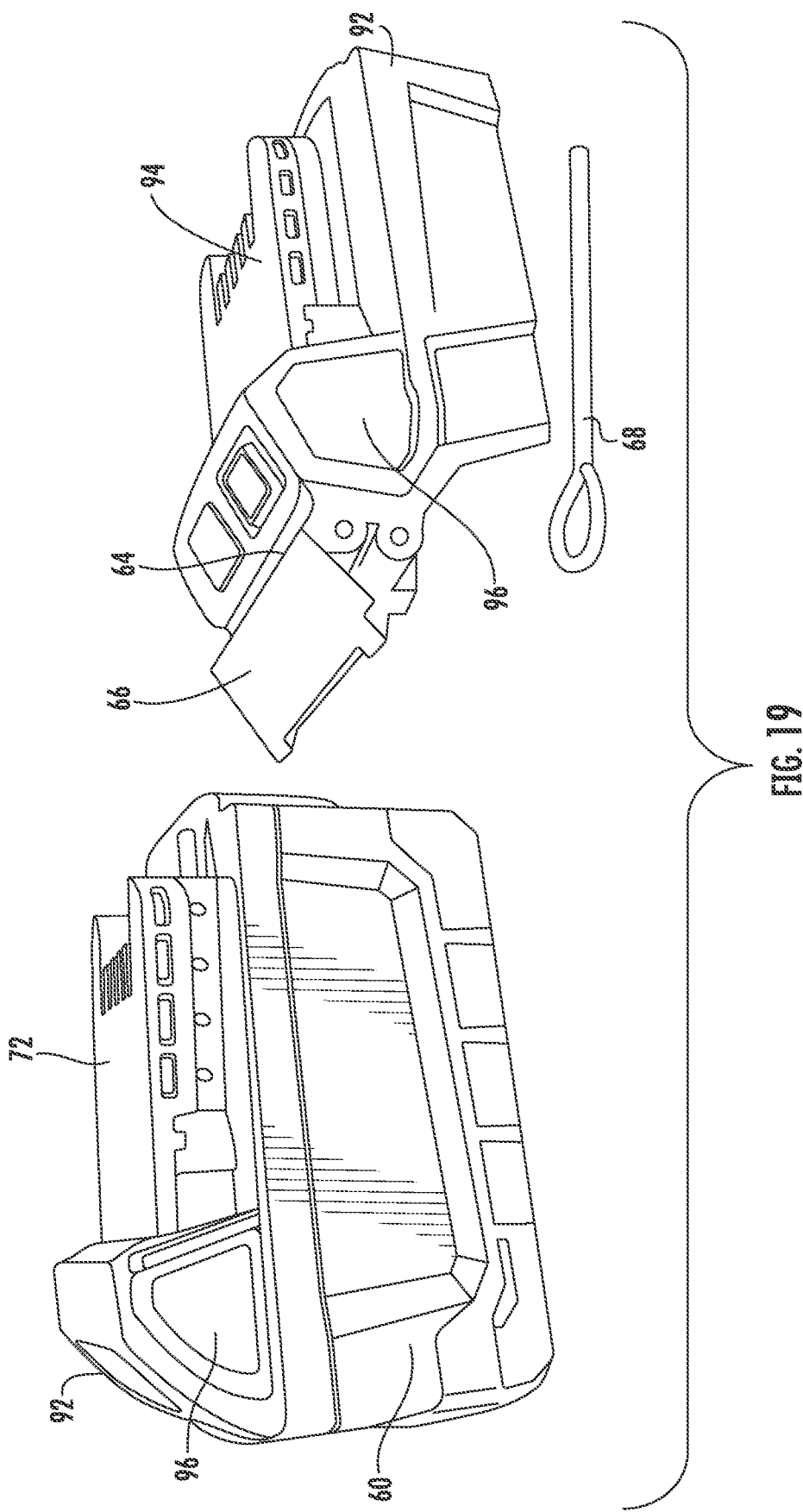

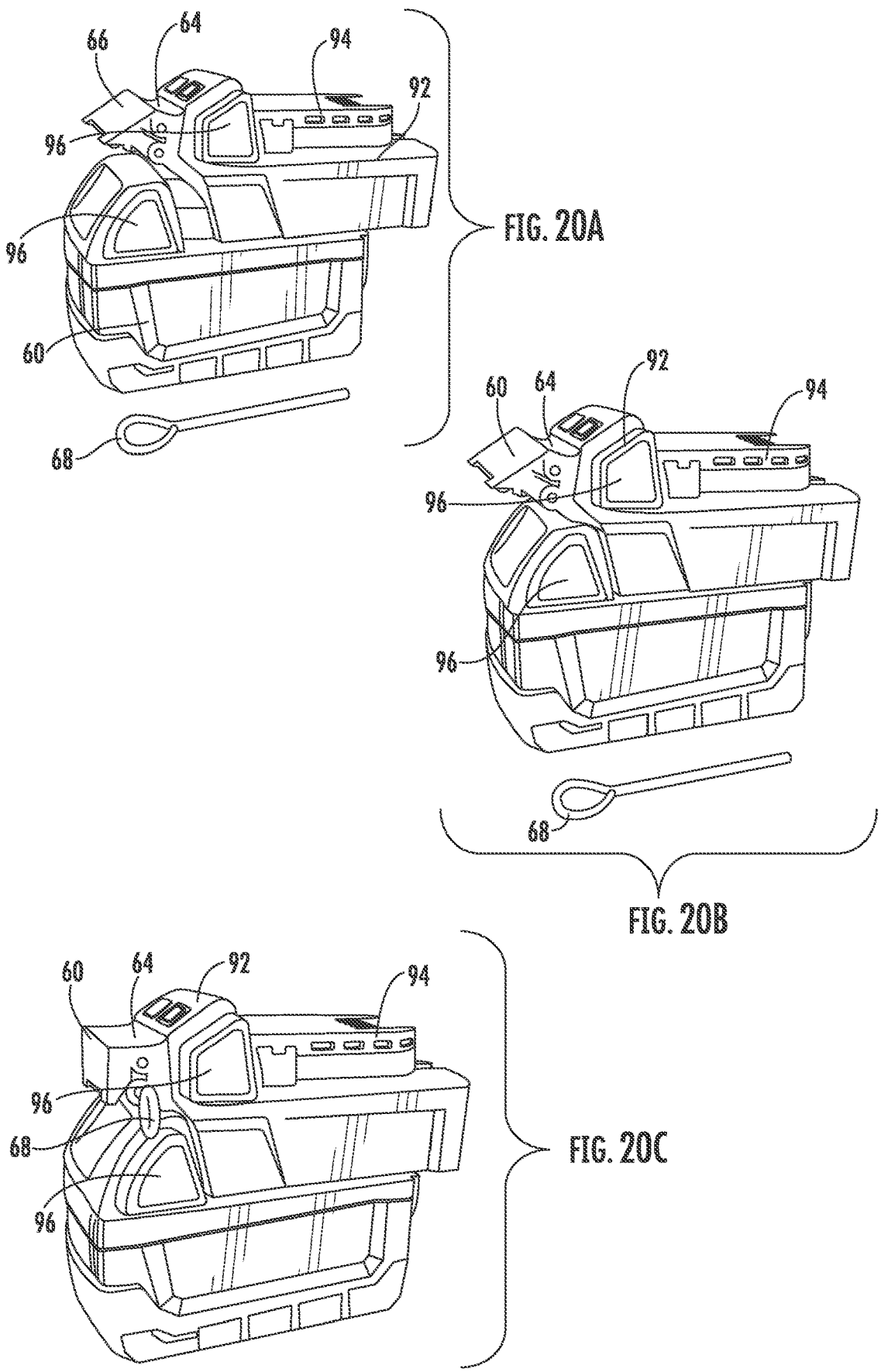

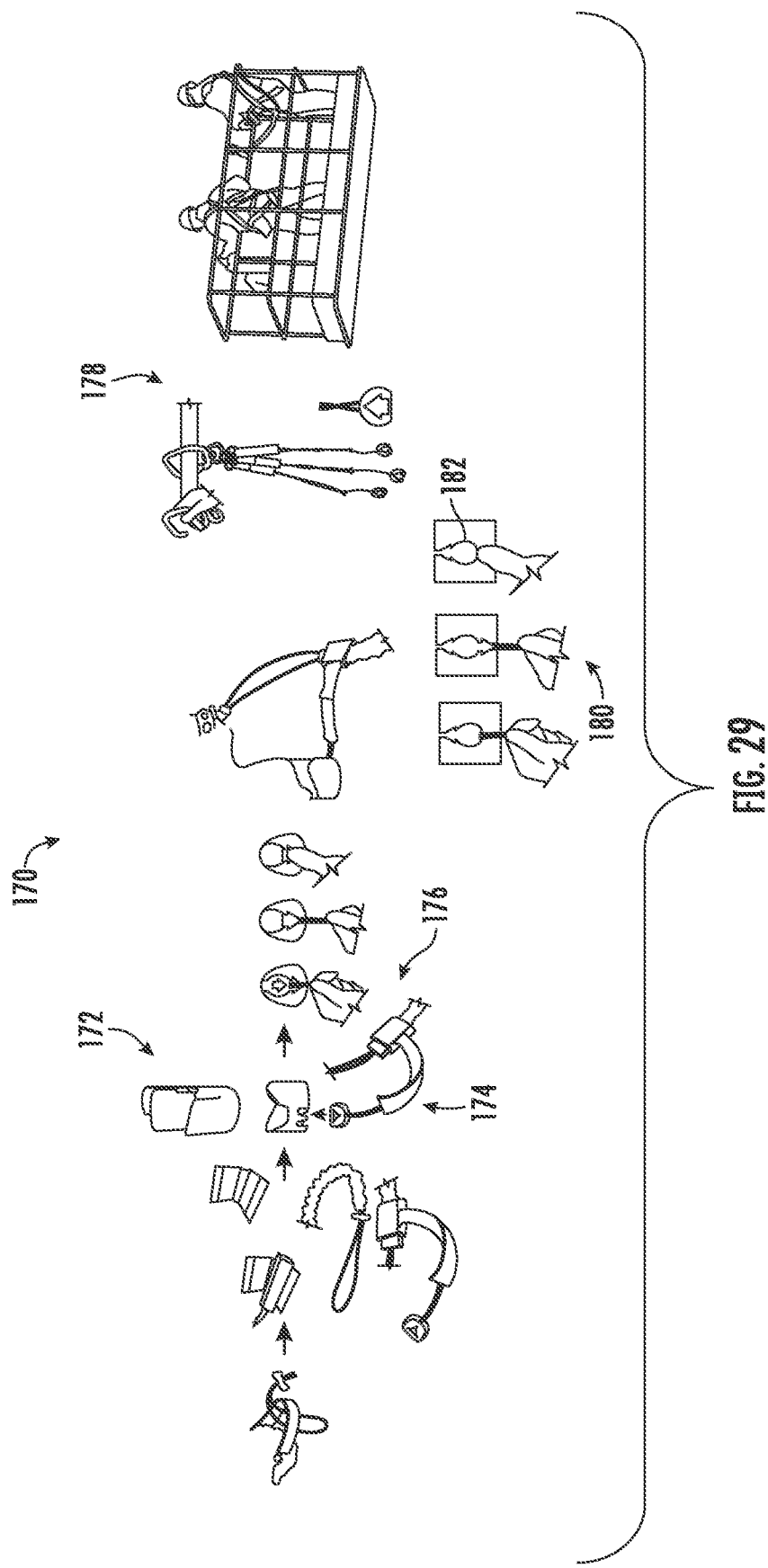

BATTERY PACK WITH LANYARD RECEIVER AND TETHER WITH QUICK ATTACHMENT

CROSS-REFERENCE TO RELATED PATENT APPLICATIONS

The present application is a continuation of International Application No. PCT/US2018/052466, filed Sep. 24, 2018, which claims the benefit of and priority to U.S. Provisional Application No. 62/726,751 filed on Sep. 4, 2018, and U.S. Provisional Application No. 62/671,141 filed on May 14, 2018, and U.S. Provisional Application No. 62/562,763 filed on Sep. 25, 2017, which are incorporated herein by reference in their entireties.

BACKGROUND OF THE INVENTION

The present invention relates generally to the field of tools. The invention generally relates to batteries for use with electrical devices, such as power tools, outdoor tools, etc., and more particularly, to a battery pack with a lanyard receiver. The present invention relates specifically to tethers for a tool or tool component, such as a tool battery. Tethers are used to attach to/support components or equipment to provide security when an operator inadvertently drops the equipment.

SUMMARY OF THE INVENTION

One embodiment of the invention relates to a power tool battery. The power tool battery includes a housing with an upper housing and a lower housing. The lower housing is configured to be coupled to the upper housing. The interior surfaces at the lower housing and upper housing define a cavity (e.g., to house battery cells) when the lower housing and upper housing are coupled together. A battery cell may be located within the cavity. A vertical axis may pass through the housing at a midpoint of the housing. The vertical axis can divide or separate the housing into a first side and a second side. A tool receiver is located on a first side of the housing and includes an electrical contact. The tool receiver is configured to receive a tool powered by the battery. A tether receiver located on the second side opposite the tool receiver is formed on the battery housing.

Another embodiment of the invention relates to a battery cradle that includes a power tool battery, a sleeve, a clasp, and a tether receiver. The sleeve receives the battery and circumscribes a portion of the battery. The clasp then secures the sleeve to the battery and overlays a portion of the battery within the sleeve. The clasp can move to an open position or a closed position. The open position allows for battery removal and replacement and the closed position confines the battery within the sleeve. The tether receiver is formed on either the sleeve or the clasp. The tether receiver attaches a tether to the sleeve or clasp that confines the battery. The tether receiver can then secure the battery to the tether.

Another embodiment of the invention relates to a tether attachment system for a power tool battery. The tether attachment system includes a power tool battery, a tether key with a biasing element, and a tether attachment. The tether attachment includes a channel to receive the tether key and two or more adjacent locking pockets. The tether key can move from the channel into the locking pockets where the biasing element creates a friction fit that secures the tether key in the locking pocket.

BRIEF DESCRIPTION OF THE DRAWINGS

This application will become more fully understood from the following detailed description, taken in conjunction with the accompanying figures, wherein like reference numerals refer to like elements in which:

FIG. 18A is a perspective view of a sleeve secured to a retrofit battery, the sleeve includes securing tabs that secure the sleeve to the retrofit battery housing and allow the retrofit battery to engage a tool, according to an exemplary embodiment.

FIG. 18B is a perspective view of a sleeve secured to a retrofit battery, the sleeve includes securing tabs that secure the sleeve to the retrofit battery housing and allow the retrofit battery to engage a tool, according to an exemplary embodiment.

FIG. 18C is a perspective view of a sleeve secured to a retrofit battery, the sleeve includes securing tabs that secure the sleeve to the retrofit battery housing and allow the retrofit battery to engage a tool, according to an exemplary embodiment.

FIG. 19 is a perspective view of an intermediary tethering adapter that locks onto the battery at a power tool receiver of the retrofit battery, according to another exemplary embodiment.

FIG. 20A illustrates the intermediary tethering adapter of FIG. 19 showing the intermediary tethering adapter first being attached at a power tool receiver of the retrofit battery, according to an exemplary embodiment.

FIG. 20B illustrates the intermediary tethering adapter of FIG. 19 showing the intermediary tethering adapter sliding along the power tool receiver of the retrofit battery and coupling to the retrofit battery, according to an exemplary embodiment.

FIG. 20C illustrates the intermediary tethering adapter of FIG. 19 coupled to the retrofit battery in the closed or locked position with a cotter-pin securing the locked coupling, according to an exemplary embodiment.

FIG. 29 illustrates a battery sleeve that allows for quick attachment of a battery tether and enables both the battery and the tool to be tethered simultaneously, according to an exemplary embodiment.

DETAILED DESCRIPTION

Figure 1:
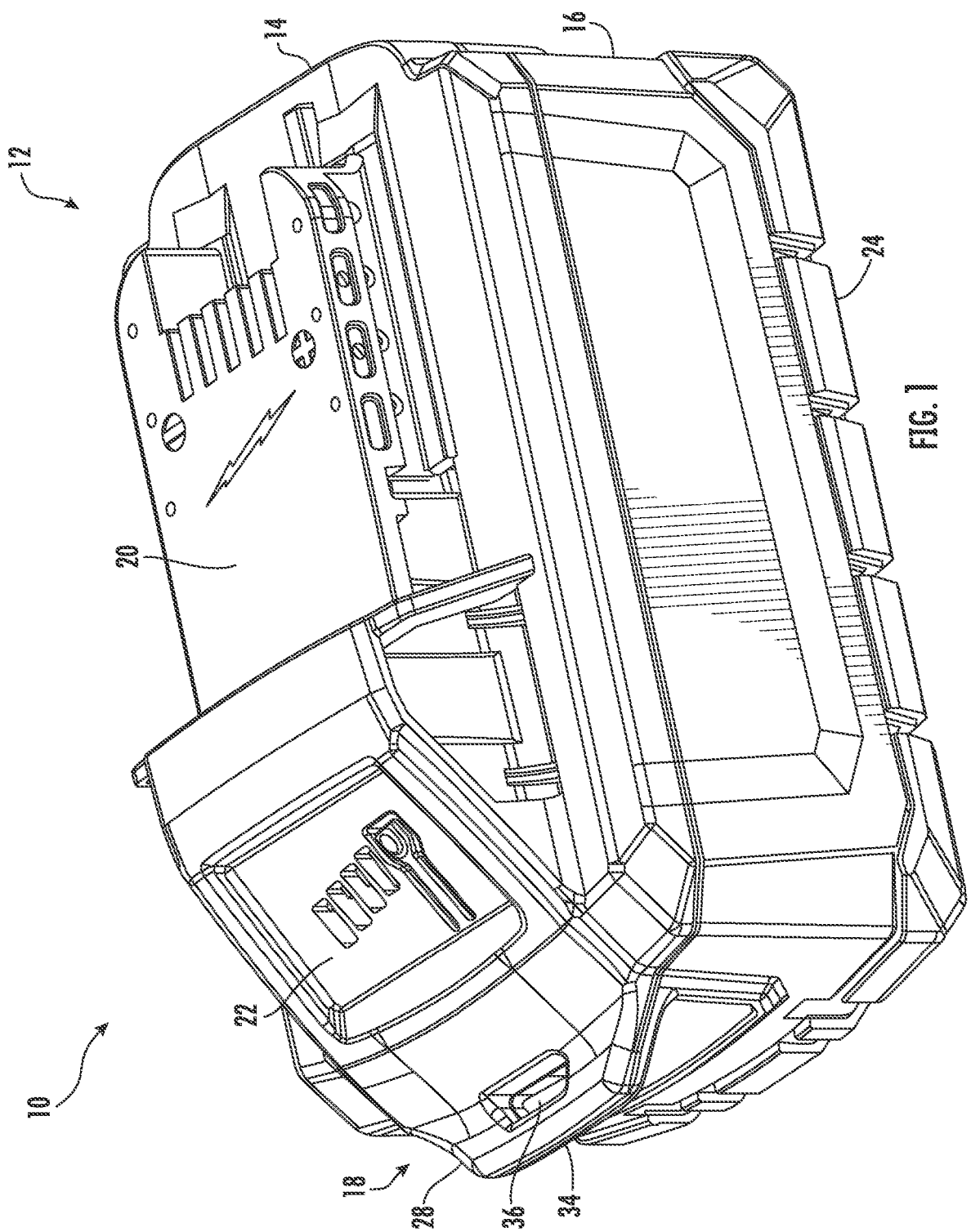
FIG. 1 is a perspective view of an exemplary battery pack with a tether receiver, according to an exemplary embodiment.

Referring generally to the figures, various embodiments of a battery tether system are shown. To enhance safety, tools, and tool batteries can be tethered (e.g., when working at height). In some circumstances, various regulations (e.g., OSHA regulations) may require tethering of tools and tool batteries when used at height. For example, without a battery tethering system, when a tool battery is depleted and needs to be replaced, a worker working at height returns to the ground to replace the battery before returning to the elevated position. In some circumstances, changing or storing an untethered battery at an elevated position may be unsafe and may violate various rules and/or regulations.

Power tool battery tethering poses a number of challenges specific to the field of power tool batteries. For example, power tool batteries often include vent or drainage holes to vent the heat and drain any water, and as such generally do not present adequate locations for attaching a tether while engaging a tool. As another example, often the battery is substantially enveloped by the tool, leaving limited exposed surfaces available for tethering the battery. As discussed in the various embodiments herein, Applicant has developed a variety of power tool battery tethers and battery tether attachment systems that provide for battery tethering without impeding vent or drainage holes and that provide for robust tether attachment despite the small surface area available for tether attachment hardware.

In various embodiments, the disclosure provides various devices, systems and methods to: attach a tether to a tether receiver integral with a battery, retrofit batteries, including power tool batteries, to accept a tether independent from the tool or battery, retrofit batteries with a power tool adapter that adds a tether receiver in between a power tool and a battery, and/or an interchangeable tether key that allows the battery to remain tethered or secured when exchanged while working overhead, along with other concepts discussed herein.

As discussed herein, Applicant has developed a power tool battery with a tether receiver, e.g., a lip, for attaching a tether to the power tool battery. In such embodiments, the tether receiver is part of (e.g., pre-attached, built-in, etc.) the battery housing. In specific embodiments, the tether receiver includes upper and lower sections that are is integral with the upper housing and lower housing, respectively, and the complete tether receiver is formed when the upper housing is joined to the lower housing. The power tool battery is configured to directly connect the tether to the tether receiver on the battery.

Tethering a battery with a built-in tether receiver enhances compliance with rules and regulations while working overhead. An operator simply attaches the tether at the tether receiver on the battery designed to receive the tether. The tether receiver can be integral to the housing, or may be constructed from the coupling of housing components. By providing batteries with built-in tether receives, such batteries as provided herein provide the tether receiver without interfering with the power tool attachment to the battery.

As will be understood, some users have existing power tool batteries that do not have a built-in tether receiver. Accordingly, Applicant has developed an independent housing assembly, or sleeve to attach to the battery which includes a tether receiver. This enables the tethered use of existing battery packs without a built-in tether receiver.

Various sleeve designs are introduced to retrofit battery housings without a built-in tether receiver. The sleeves are designed to retrofit a wide variety of batteries and do not interfere with the engagement of the tool with the battery.

One mechanism of attaching a tether receiver to a battery includes attaching an intermediary structure to the tool receiver. A tether receiver attached to the tool receiver of a battery may transmit the power from the battery to a second tool receiver on the intermediary tether receiver. In this way, the intermediary structure serves as a bridge from the battery to the power tool and provides structure for securely attaching a tether receiver to the battery.

In various embodiments, the battery sleeves or tether attachment structures discussed herein are configured for quick release battery tethers. Applicant believes that a battery tether design that is fast and easy (e.g., quick release) will enhance worker compliance with rules/regulations related to tether maintenance. In particular, for embodiments discussed herein, a tether end or tether key includes a biasing element to secure the tether into a locking pocket within the tether attachment structure of the battery. The tether may also be configured to quickly insert into a larger hole configured to receive the tether key. The hole is slightly larger than the tether and communicates with locking pockets adjacent to the hole. In this way, an operator inserts the tether key in the center hole and pushes and slides the tether key into a frictional fit locking pocket. Releasing the tether key reverses the process. The operator pushes and slides the tether key towards the center hole releasing the frictional fit in the locking pocket.

The quick release tethering system allows the battery to remain tethered at all times during use and exchange, allowing an operator to swap batteries at height. The battery attachment structures discussed herein are capable of attaching multiple tethers. Multiple tether attachment points allow a battery to remain tethered during battery transitions. A depleted battery can be easily tethered, stored, and/or replaced with another tethered (and fully charged) battery while both the depleted and fully charged battery remain tethered at all times. For example, the multiple tether attachment points allow both the depleted battery and the charged battery to remain attached at a first tether location for storage, and also attached simultaneously via a second tether location to a power tool in use.

Battery Housing with Built-In Tether Receiver

FIGS. 1-12 illustrate a power tool battery 10, or battery pack, operable to power an electrical device or power tool (not shown). The battery 10 may power a variety of different devices, such as a power tool (e.g., a drill, a saw, a grinder, etc.), an outdoor tool (e.g., a trimmer, a blower, etc.), a vehicle, a non-motorized device (e.g., a light, an audio device, a testing device, etc.). In the illustrated embodiment, the battery 10 includes a housing assembly 12 having a tether-receiving structure or tether receiver 18.

The housing assembly 12 includes an upper housing portion 14 and a lower housing portion 16. The housing assembly 12 is configured to couple the upper housing portion 14 to the lower housing portion 16 and define a cavity, or recess 32, within the interior surfaces of the housing assembly 12. The upper housing portions 14 and lower housing portion 16 may be molded from a plastic material such as polyethylene. The upper housing portion 14 and lower housing portion 16 may be made of the same or different materials. The upper housing portion 14 may attach to the lower housing portion 16 to form the battery housing assembly 12. The housing assembly 12 includes a vertical axis through a midpoint of the housing. The vertical axis divides the housing into a first side and a second side (e.g., a front and a back). The housing assembly 12 includes a horizontal axis through the midpoint of the housing assembly 12 that divides the housing assembly 12 into an upper half and a lower half. In some embodiments, the upper half corresponds to the upper housing portion 14 and the lower half corresponds to the lower housing portion 16. In other embodiments, the upper housing portion 14 and lower housing portion 16 are coupled above or below the horizontal axis. For example, the upper housing portion 14 and lower housing portion 16 may be coupled at a location more than ⅓, ½, ⅔ of the distance between the horizontal plane and the top or bottom of housing assembly 12. Housing assembly 12 may include a tether receiver 18, a power tool receiver 20, a status indicator 22, a bumper 24, one or more battery cells 26 enclosed within housing assembly 12, and/or other components.

As illustrated in FIGS. 1-10, housing assembly 12 includes a tether receiver 18 for connecting a tether 50 (illustrated in FIG. 10) to the battery 10. The tether receiver 18 may be formed on a side of the battery opposite the power tool receiver 20. In some embodiments, the tether receiver 18 includes a lip or protrusion 28 extending outwardly from a wall 30 and beyond the footprint 52. The receiver further includes a bridge 34 that extends across protrusion 28 and forms an opening 36. Opening 36 extends completely through the protrusion 28 to allow a tether 50 or lanyard to connect to and/or pass through tether receiver 18.

In some embodiments, tether receiver 18 includes an upper portion (e.g., protrusion 28) that is contiguous with upper housing portion 14 and a lower portion (e.g., protrusion 28) contiguous with the lower housing portion 16. The upper portion of tether receiver 18 is coupled to the lower portion of the tether receiver 18 when upper housing portion 14 is coupled to lower housing portion 16, such that when the upper housing portion 14 is coupled to the lower housing portion 16 the tether receiver 18 is formed in housing assembly 12. When the upper and lower housing portions 14 and 16 are assembled together, an upper protrusion 38 and lower protrusion 40 align to form an assembled protrusion 28. Similarly, upper bridge portion 42 aligns with the lower bridge portion 44 to form the bridge 34 and opening 36 of the tether receiver 18. When the battery 10 is tethered to a lanyard, the upper and lower protrusions 38 and 40 cooperate and distribute stress exerted by the lanyard or tether 50 between the upper and lower housings 14 and 16. Portions of the tether receiver 18 may be provided integrally within one or the other of the upper housing portion 14 or the lower housing portion 16. For example, the protrusion 28, bridge 34, and/or opening 36 can be integral with the upper housing portion 14 or the lower housing portion 16 such that tether receiver 18, or a portion thereof, is housed within either upper or lower housing portion 14 or 16. In other embodiments, tether receiver 18 is a separate component or part from housing assembly 12. For example, tether receiver 18 is a separate component attached to housing assembly 12 with fasteners or captured between upper and lower housing portions 14 and 16.

Tether receiver 18 may be formed from a different material than housing assembly 12. Upper and lower housing portions 14 and 16, protrusions 38 and 40 and bridge portions 42 and 44 can be formed from the same or different materials. The different materials can impart the same, similar, or different material properties. For example, one or more portions can be formed from a first material selected for weight, thermal conductivity, or other characteristics, the other portion(s) can be formed from a second material selected for strength, rigidity, wear resistance, or other characteristics.

Figure 10:
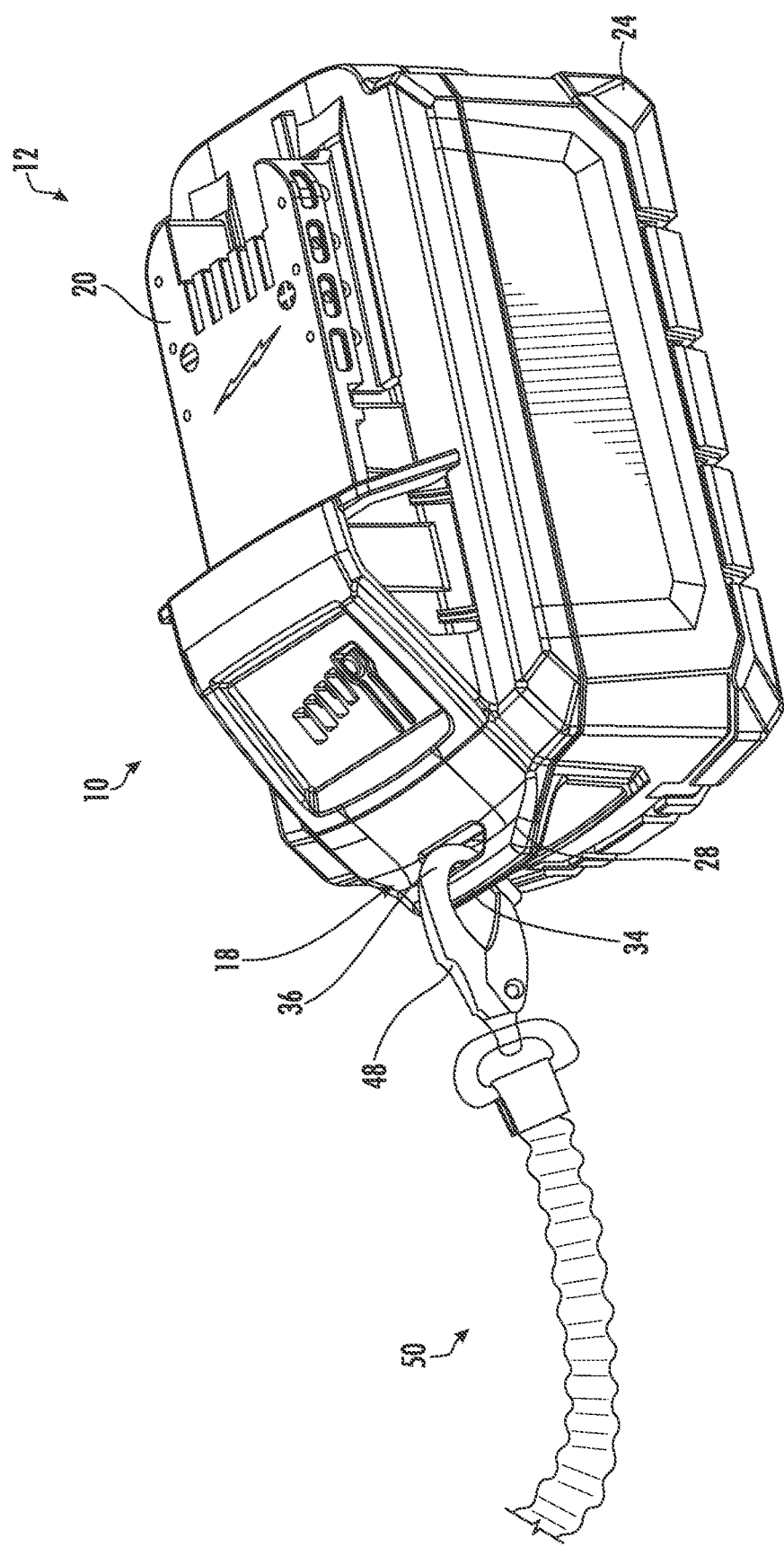
FIG. 10 is a perspective view of the battery pack of FIG. 1, further illustrating a lanyard attached thereto, according to an exemplary embodiment.

Opening 36 is operable to receive a clip 48 on a strap, lanyard, or tether 50. FIG. 10 illustrates a clip 48 attached to tether 50 that engages tether receiver 18 to secure battery 10. A portion of tether 50 (e.g., a loop) can pass through the opening 36 and engage the bridge 34 of the tether receiver 18. With tether 50, battery 10 can tether or couple to a support (e.g., the body of a user or a platform) independently from the power tool. This arrangement provides an additional failsafe should the power tool be inadvertently dropped or disengaged while the battery 10 is coupled. Additionally, by tethering the battery 10 separately from the device, a user can change the battery 10 without untethering the power tool or device. The battery 10 can be connected to the device and tethered. This arrangement allows for changing and storing battery packs at height.

FIGS. 1-10 show the tether receiver 18 opposite the power tool receiver 20 of the housing assembly 12. Tether receiver 18 can be disposed at another location on the housing assembly 12. For example, battery 10 can locate tether receiver 18 on either side, on the top, on the bottom, or at another location. In some embodiments, battery 10 can include more than one tether receiver 18 to receive one or more tethers 50. As will be discussed in detail below, tether receiver can attach to the power tool receiver 20.

Housing wall 30 defines the footprint 52 that encloses cavity 46. The illustrated protrusion 28 includes upper protrusion 38 and lower protrusion 40 on the upper and lower housings 14 and 16, respectively. Likewise, the illustrated bridge 34 includes upper and lower bridge portions 42 and 44. The upper and lower protrusions 38 and 40 define opening 36. In the illustrated construction, the upper protrusion 58 and the upper bridge portion 42 are integrally formed with (e.g., molded as a single part with) the upper housing portion 14. The lower protrusion 40 and the lower bridge portion 44 are integrally formed with (e.g., molded with) the lower housing portion 16.

Figure 11:
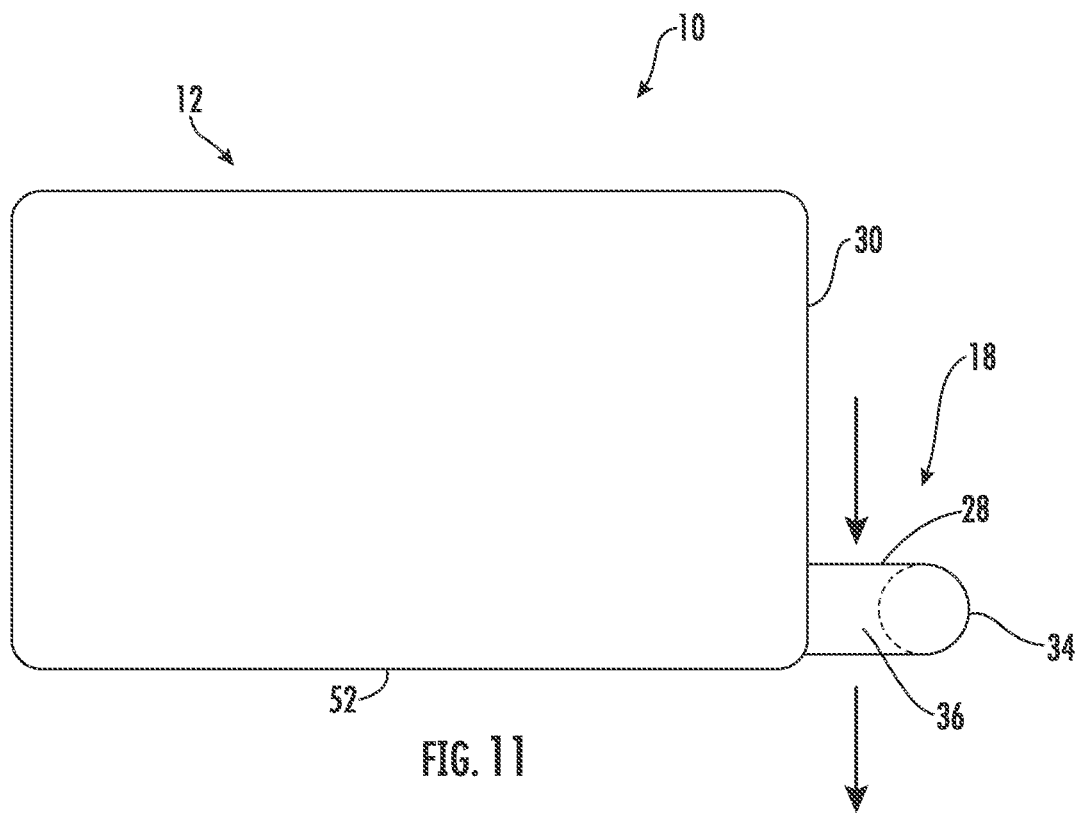
FIG. 11 is a schematic view of a battery pack with an external tether receiver extending beyond a footprint of the battery housing, according to an exemplary embodiment.
Figure 12:
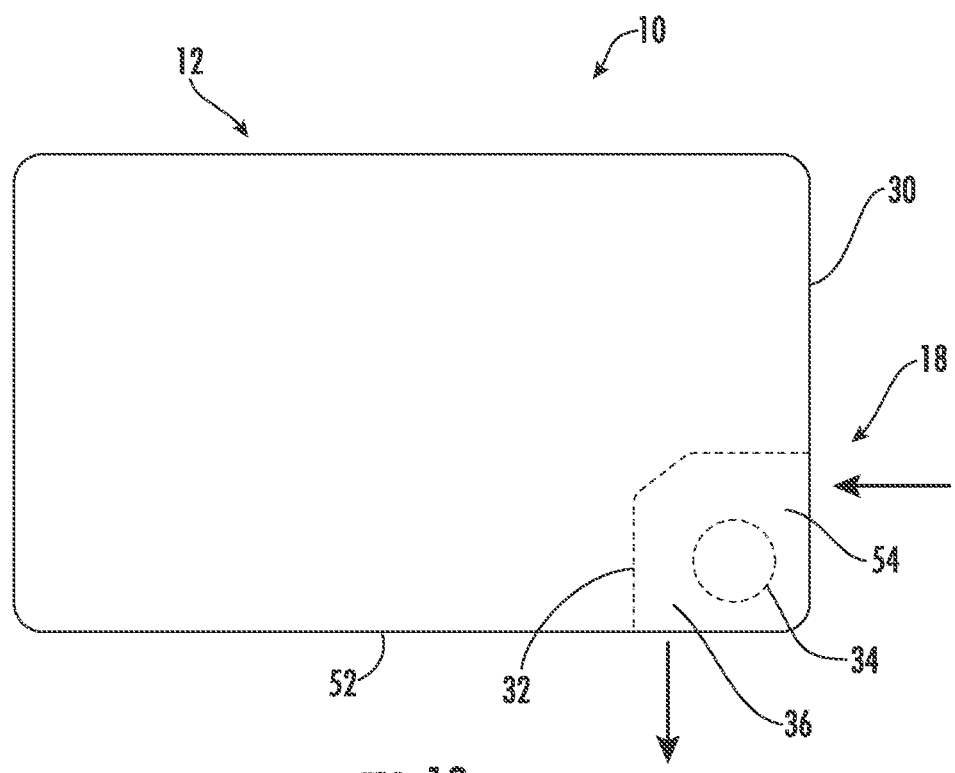
FIG. 12 is a schematic view of a battery pack with an internal tether receiver where the tether receiver is housed within the footprint of the battery housing, according to an exemplary embodiment.

Tether receiver 18 can be located external (e.g., FIG. 11) or internal (e.g., FIG. 12) to a footprint 52 of the housing assembly 12. A maximum cross-sectional area of the housing assembly 12 along the horizontal axis that does not include the tether receiver 18 defines the footprint 52. In FIG. 11, tether receiver 18 forms extends outwardly and is external to footprint 52. For example, tether receiver 18 extends away from the housing wall 30 defining the maximum cross-sectional area along the horizontal axis. In FIG. 12, tether receiver 18 is formed internal to footprint 52. The cross-sectional area encircled by the housing assembly 12 along the horizontal axis defines an external housing wall 30 of the housing assembly 12 that envelopes the internally formed tether receiver 18. Housing wall 30 can include a recessed portion extending inwardly to form a recess 32 for tether receiver 18 and/or opening 36. A bridge 34 can extend across recess 32 to create opening 36 and/or bridge 34 internal to footprint 52. In some embodiments, tether receiver 18 is formed within a recess 32 of footprint 52 defined by the outer housing wall 30. The outer footprint 52 of the housing assembly 12 may enclose the tether receiver 18 within a recess 32 of the housing wall 30. In other embodiments, the tether receiver 18 is formed outside, or external to, the outer footprint 52 defined by the housing walls 30.

Opening 36 does not communicate with cavity 46 to inhibit or prevent dust and debris from entering cavity 46. Opening 36 can be formed entirely within an external protrusion 28 that extends outwardly from housing assembly 12 (e.g., as shown in FIG. 11). In some embodiments, footprint 52 extends away from housing wall 30 to form the protrusion 28 with opening 36 between the protrusion 28 and the wall 30. In other embodiments, bridge 34 with an opening 36 is formed internally within a recess 32 of housing wall 30. The bridge 34 or extends across an opening 36 formed within recess 32 of the outer housing wall 30. The recess 32 is formed within a footprint 52 inside the outer housing wall 30.

In some embodiments, the tether receiver 18 adjusts or moves relative to housing assembly 12. For example, tether receiver 18 may move to an attachment condition (similar to that shown in FIGS. 1-12), in which tether receiver 18 is available for attachment of tether 50. When not in use, tether receiver 18 can adjust to a storage condition, not engageable by tether 50. In this configuration, tether receiver 18 may not interfere with or obstruct use of the battery 10. For example, tether receiver 18 may extend beyond a footprint 52 of housing assembly 12 to receive a tether 50. Tether receiver 18 can retract, e.g., to a position within footprint 52 for storage. Tether receiver 18 may adjust between an extended or retracted position. In some embodiments the retracted position is covered to store battery 10 and the extracted position is uncovered to receive tether 50.

Housing assembly 12 can include a power tool receiver 20 that attaches a power tool or device. Power tool receiver 20 can include an electrical contact located on a top, bottom, or side of the housing. For example, power tool receiver 20 can use electrical contacts to transmit power form the battery 10 to a power tool or device. Power tool receiver 20 is configured to receive and power a tool by supplying electrical current and voltage from battery 10 to the tool or device. Power tool receiver 20 may have a standard shape or form for attaching a variety of different power tools (e.g., a proprietary standard design). Power tool receiver 20 may have a different shape for different batteries 10, for example, so that a 18 V battery cell 26 is not configured to attach to a 12 V tool. Power tool receiver 20 is illustrated on a top surface of housing assembly 12 but may be disposed on a side, bottom, front, or back. Power tool receiver 20 can be located to avoid interfering with tether receiver 18. As illustrated, tether receiver 18 and power tool receiver 20 are located on opposite sides. Power tool receiver 20 and tether receiver 18 may be disposed on the same or similar sides of housing assembly 12. For example and as described in greater detail below, power tool receiver 20 may connect to an intermediary tether adapter 92 that provides a lanyard attachment location and also transmits electrical power to a power tool coupled to the intermediary tether adapter 92. In some embodiments, access to power tool receiver 20 enables switching batteries 10 to a power tool while each battery 10 remains tethered to a tether receiver 18.

Figure 2:
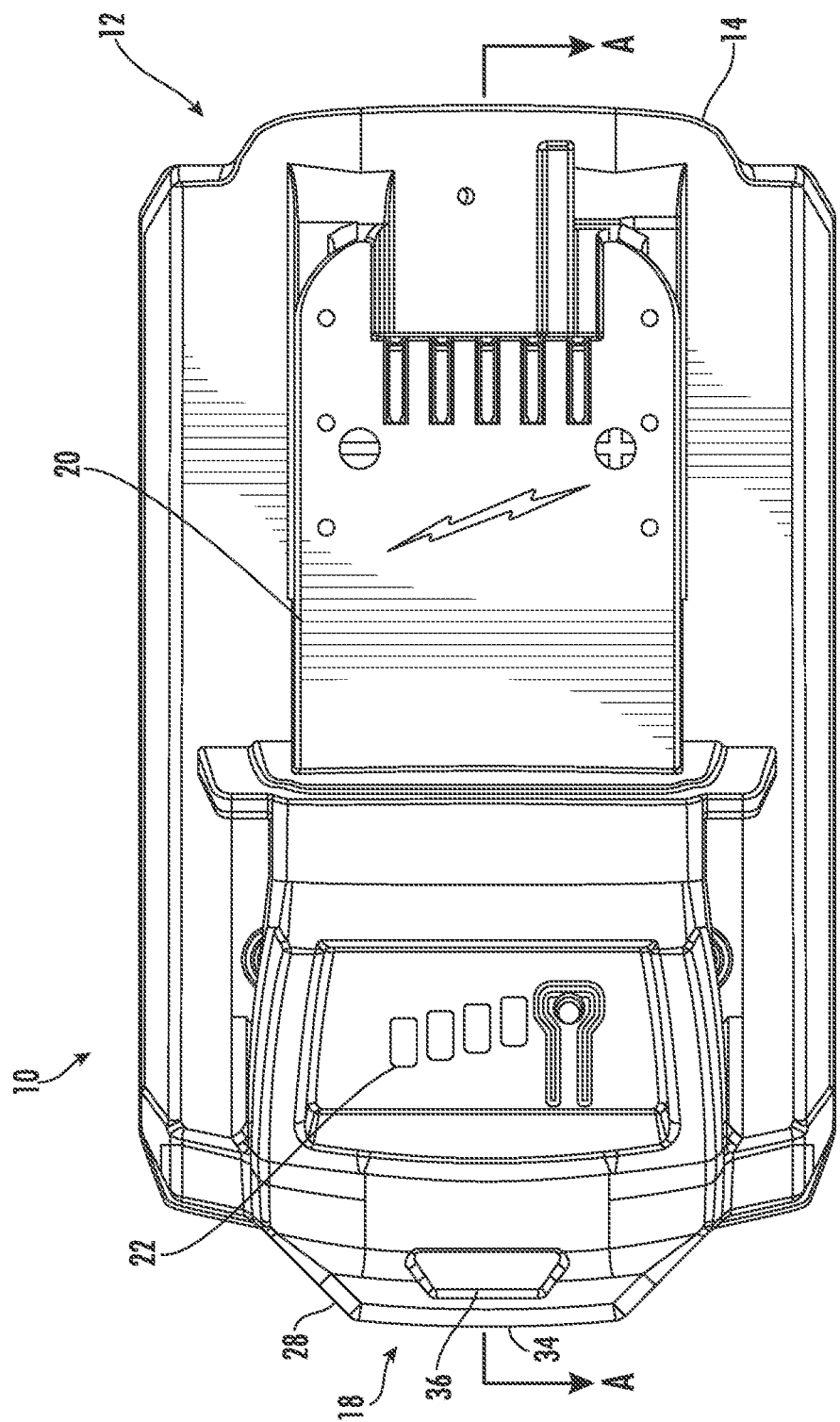
FIG. 2 is a top plan view of the battery pack of FIG. 1, according to an exemplary embodiment.
Figure 3:
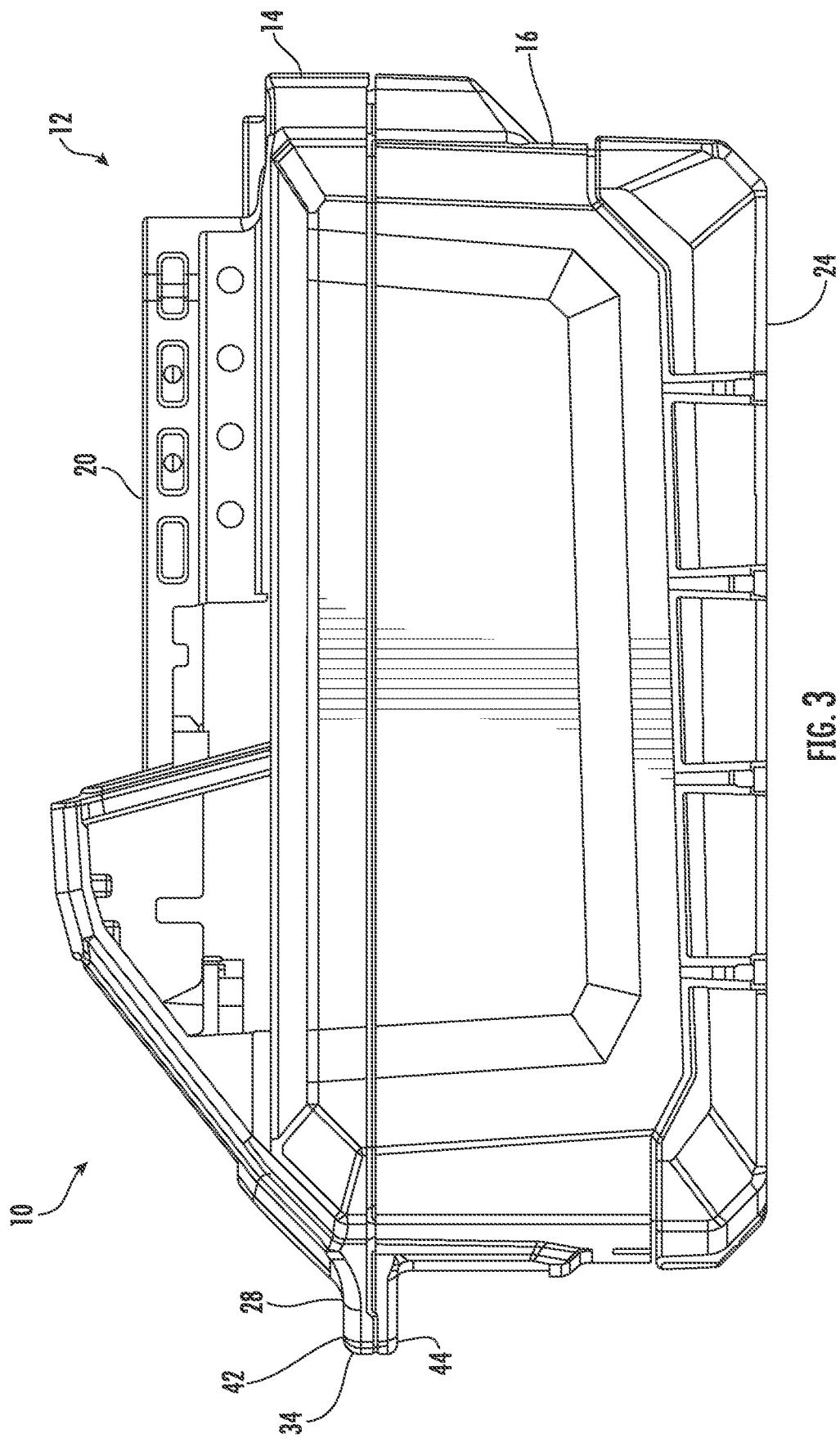
FIG. 3 is a side elevation view of the battery pack of FIG. 1, according to an exemplary embodiment.
Figure 4:
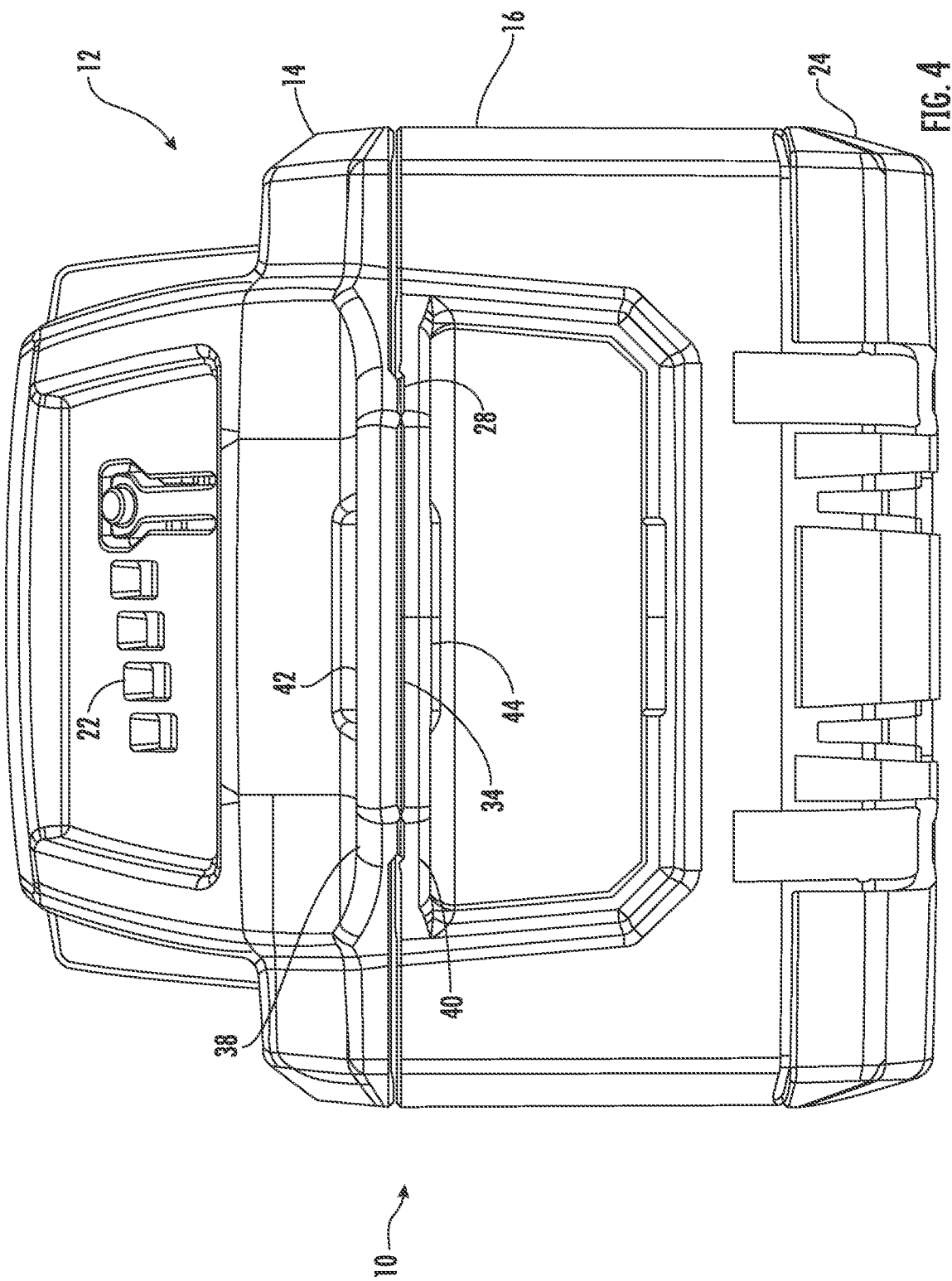
FIG. 4 is a front elevation view of the battery pack of FIG. 1, according to an exemplary embodiment.
Figure 5:
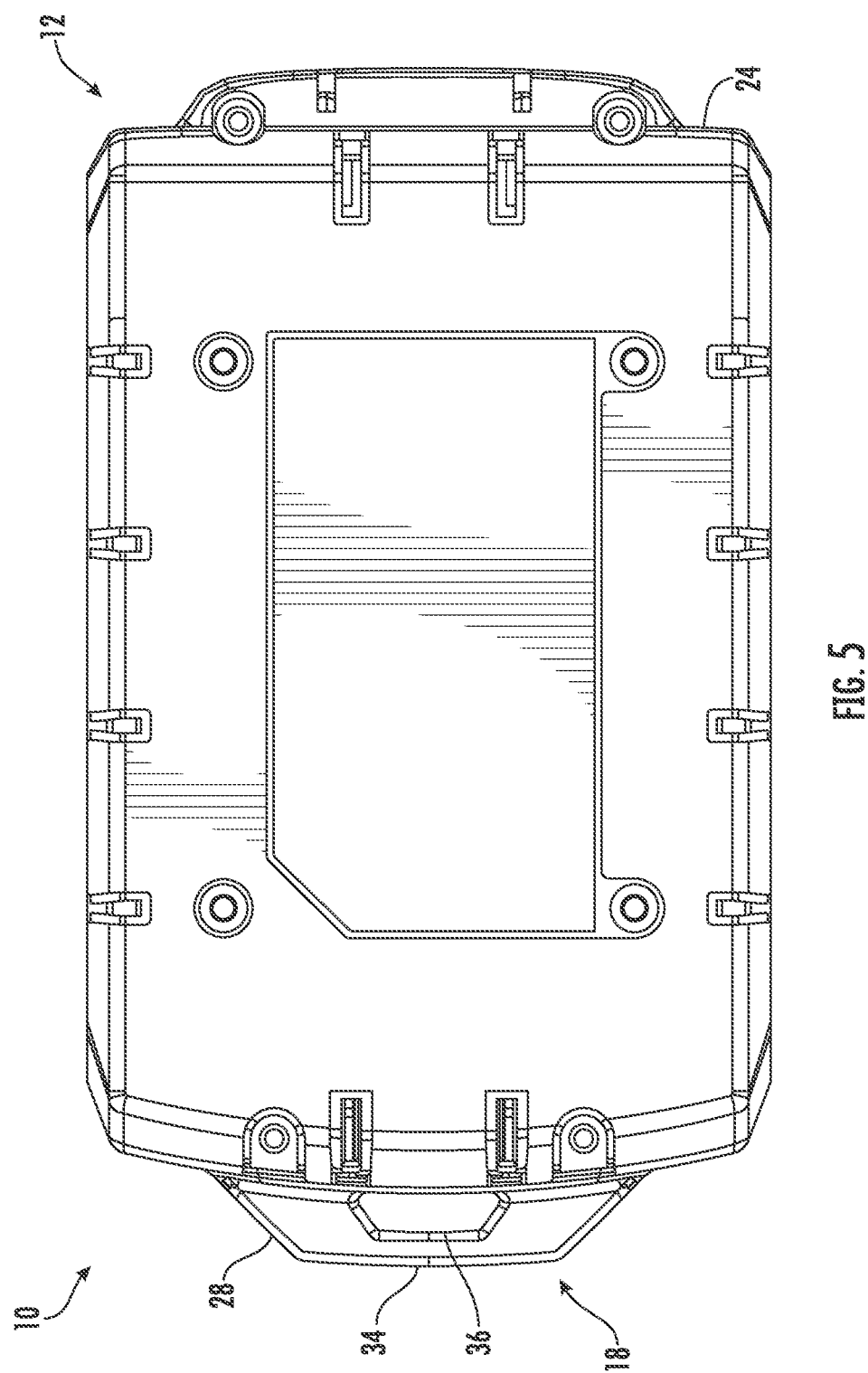
FIG. 5 is a bottom plan view of the battery pack of FIG. 1, according to an exemplary embodiment.
Figure 6:
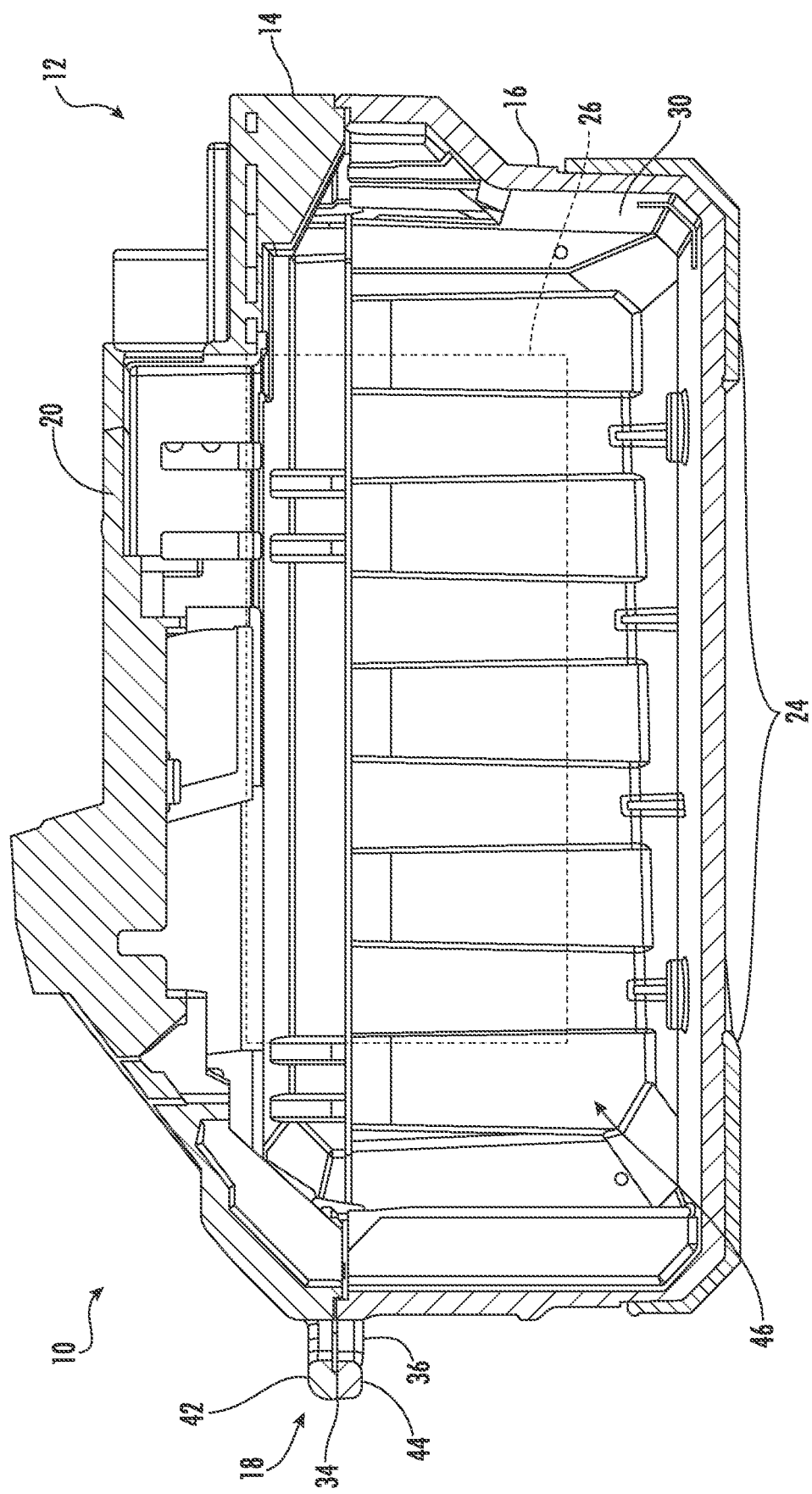
FIG. 6 is a cross-sectional view of the battery pack of FIG. 2, taken generally along line A-A, according to an exemplary embodiment.

FIGS. 1-2 illustrate a power indicator or status indicator 22 on housing assembly 12 that indicates battery 10 information (e.g., a power indicator showing remaining capacity or charge). Status indicator 22 may be displayed on a front sloping face of upper housing portion 14, as illustrated. In some embodiments, status indicator 22 is housed on a side, front, back, top, or bottom of battery 10. Status indicator 22 may include a power indicator that displays the amount of power available in the battery. Status indicator 22 may display battery 10 information on upper housing portion 14 or lower housing portion 16, or in a location captured between upper and lower housings 14 and 16.

Status indicator 22 may include lights, indicators, LCD displays, touch-enabled user interfaces, or other displays to communicate or receive battery 10 information. For example, an operator may put a battery 10 in sleep mode while not in use to preserve charge. Operator may select a lower power setting to increase the time available to operate a tool or input other information through status indicator 22. Status indicator 22 may display an estimated number of hours, minutes, or seconds of remaining charge. Status indicator 22 may indicate when the battery is fully charged (e.g., display a green light), nearly depleted (e.g., orange light), and depleted (e.g., red light).

The housing assembly 12 can further include a bumper 24 attachable to the lower housing portion 16. Bumper 24 may protect battery 10 and/or provide a tether receiver 18 location to a battery 10. Bumper 24 may attach to a side opposite the power tool receiver 20 as illustrated. Bumper 24 may provide a sleeve-like fit over battery 10 (e.g., covering the base and all four sides) or may cover the base and bottom corners of battery 10. Bumper 24 may connect to a feature on battery 10 (e.g., protrusion 28) to secure bumper 24 to battery 10. Bumper 24 can protect battery 10 if the power tool and/or battery 10 falls. Bumper 24 protects the housing assembly 12 with a layer of resilient material.

Bumper 24 may be retrofit to attach a tether 50 to existing batteries 10, e.g., without a tether receiver 18. Bumper 24 may include a tether receiver 18. Bumper 24 may have a universal design to attach to any power tool battery 10. Bumper 24 may have a mesh design or include solid shapes. Materials for bumper 24 include plastics, rubber, natural rubber, vulcanized rubber, polyisoprene, sytrene-butadiene rubber, ethylene propylene EPDM, butylrubber, polyurethane, neoprene, polychloroprene, hydrogenated nitrile Hnbr/Hsn, hypalon chlorosulphonated polyethylene CSM, elastics, fabric, or other materials.

Cavity 46 of the housing assembly 12 supports one or more battery cells 26. Battery cells 26 may be rechargeable. Cells 26 include an identification number, chemistry, electrical connection, and/or other properties to provide a desired output performance for power tool battery 10. Cells 26 may be lithium-ion LIB based or include intercalated lithium ions. Other anodes and/or cathodes may be used such as NiCd and NiMH. The cells 26 may be connected in series, parallel, or use a combination of series and parallel electrical connections. The cells 26 may be selected to provide a specific output voltage, current, or capacity. A series of cells 26 may combine into a terminal block (not shown). The terminal block may include terminals of cells 26 supported by the housing assembly 12 and operable to electrically connect the battery cell(s) 26 to the device to be powered. In this application, the terminal block will be referred to simply as a battery cell 26.

Figure 7:
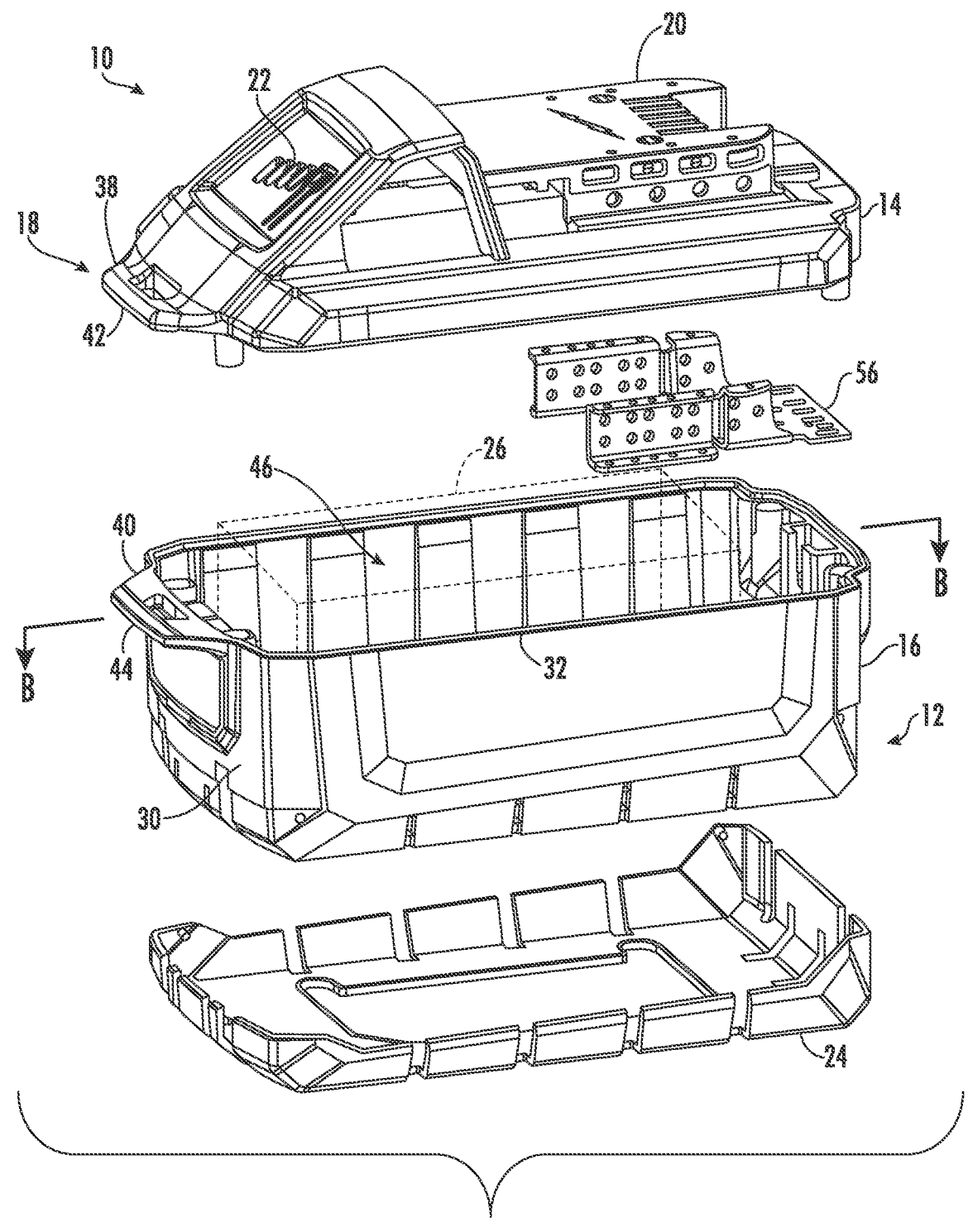
FIG. 7 is an exploded top perspective view of the battery pack of FIG. 1, according to an exemplary embodiment.
Figure 8:
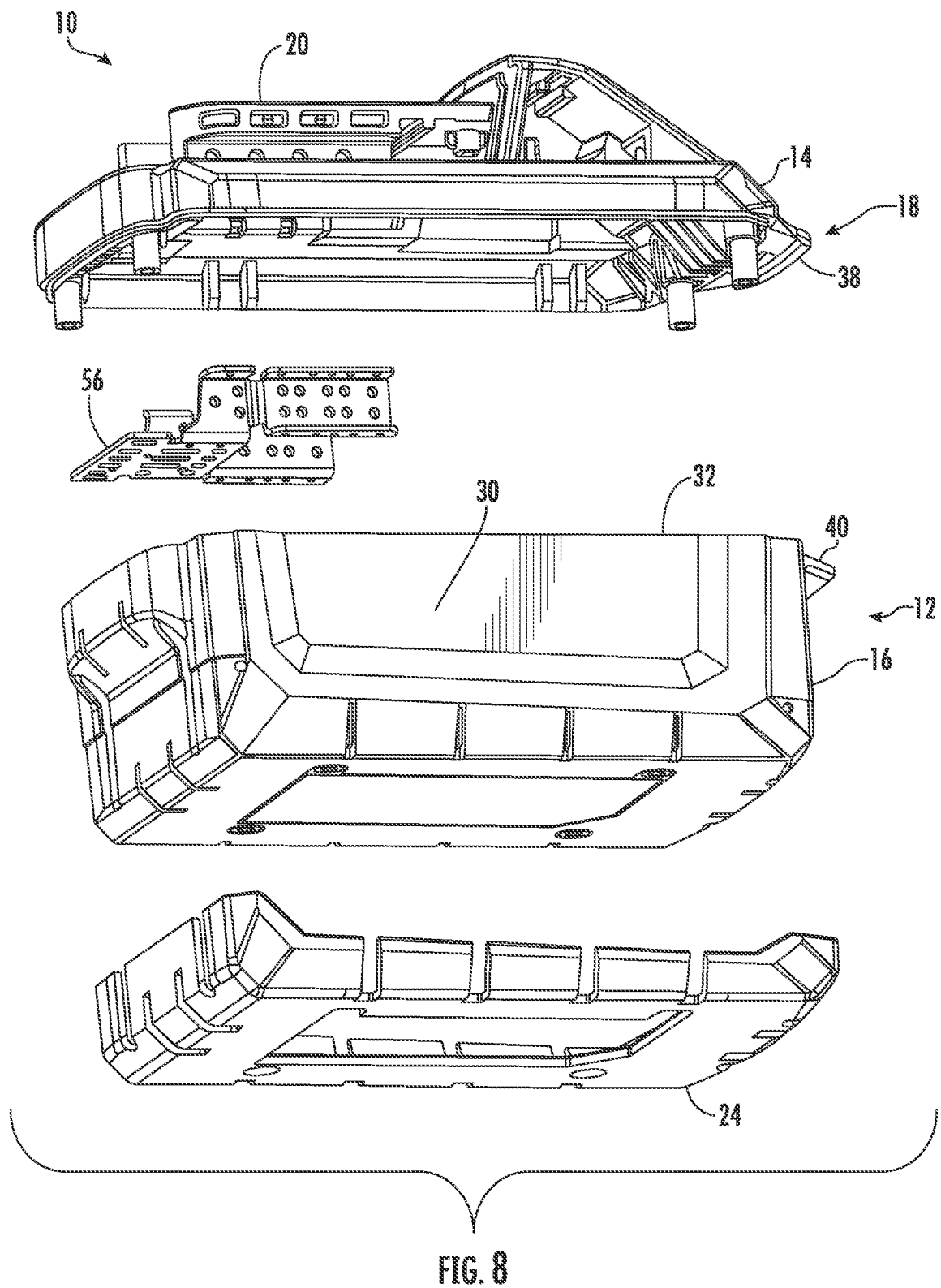
FIG. 8 is an exploded bottom perspective view of the battery pack of FIG. 1, according to an exemplary embodiment.
Figure 9:
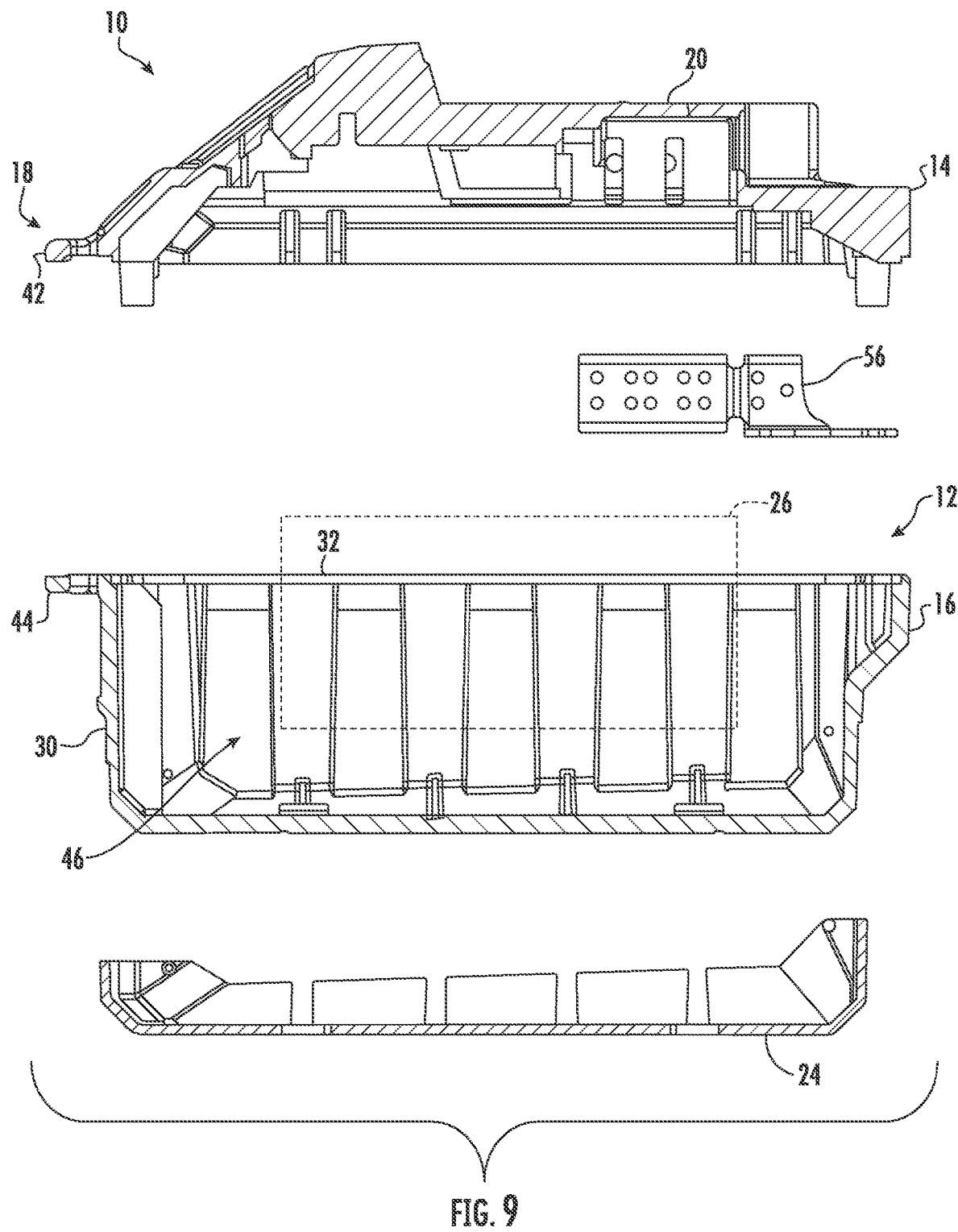
FIG. 9 is an exploded cross-section side view of the battery pack taken along line B-B, of FIG. 7, according to an exemplary embodiment.

Cells 26 may connect to housing assembly 12 through a frame 56. Frame 56 may ensure that cells 26 are stationary inside housing assembly 12 when the battery 10 is moved, rotated, or otherwise used with a power tool. Frame 56 may provide structural support to housing assembly 12 or tether receiver 18. For example, upper housing portion 14 may be secured to lower housing portion 16 through a frame 56 that stores and secures one or more cells 26 (e.g., of a lithium ion battery). As shown in FIG. 7, frame 54 provides structural support to the attachment structure of battery 10 housing assembly 12. Frame 56 can provide electrical connections (e.g., from cells 26 to power tool receiver 20 and/or from one cell 26 to an adjacent cell 26).

Retrofit Battery with Attached Tether Receiver

An operator may need to retrofit a power tool and/or battery without a built-in tether receiver 18. Rules and regulations may require tethering each battery at all times, e.g., while working at height. Existing batteries may need to add a tether receiver 18 in order to have a lanyard attachment location and to comply with rules and regulations. An existing battery with attached tether receiver 18 is a retrofit battery 60. Applicant has found a system to attach a tether 50 to a retrofit battery 60 without an integral tether receiver 18.

Figure 13:
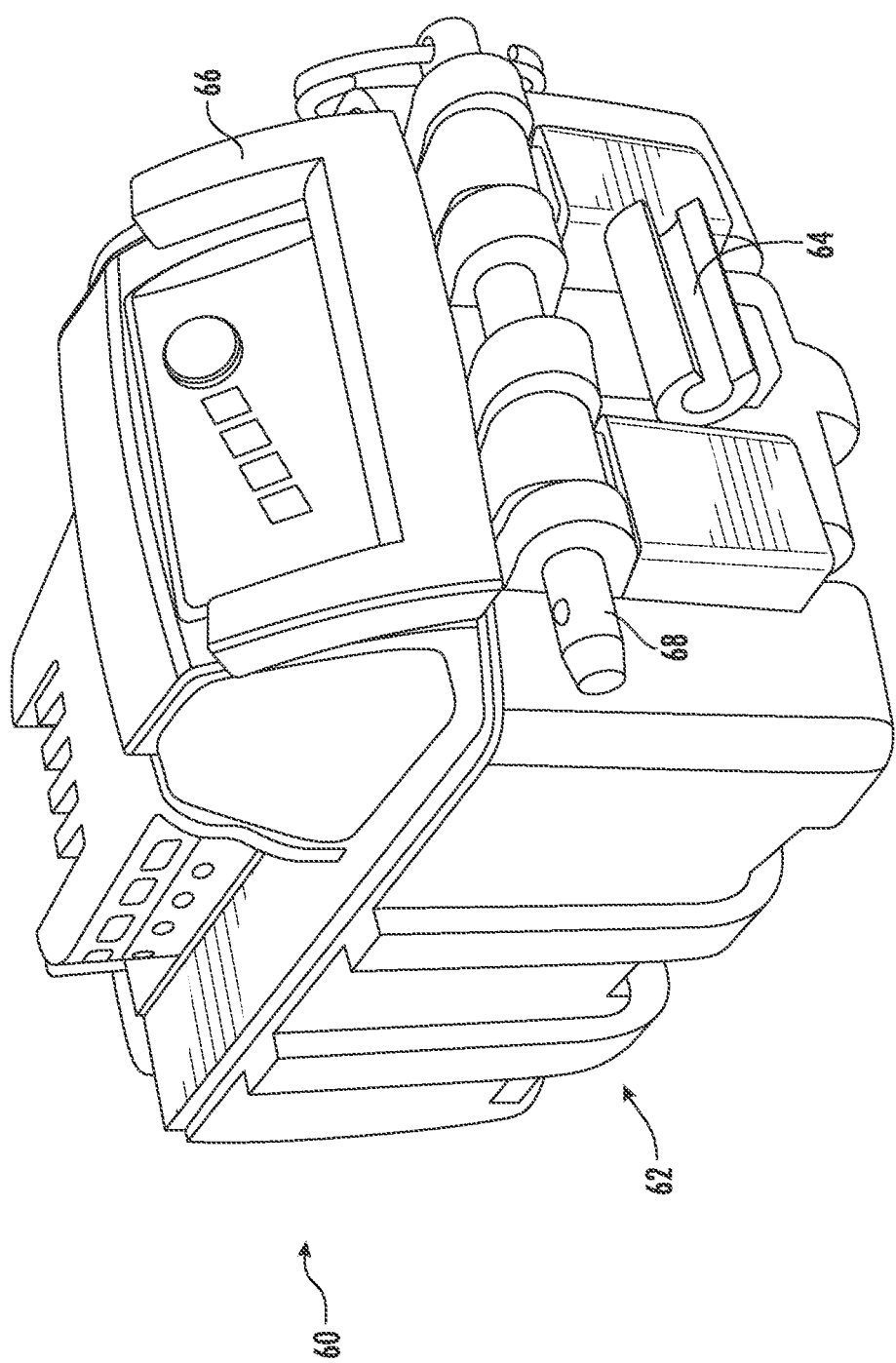
FIG. 13 is a front perspective view of a retrofit battery located inside a tether attachment sleeve, with a front arm in a locked position preventing removal of the retrofit battery, according to an exemplary embodiment.
Figure 14:
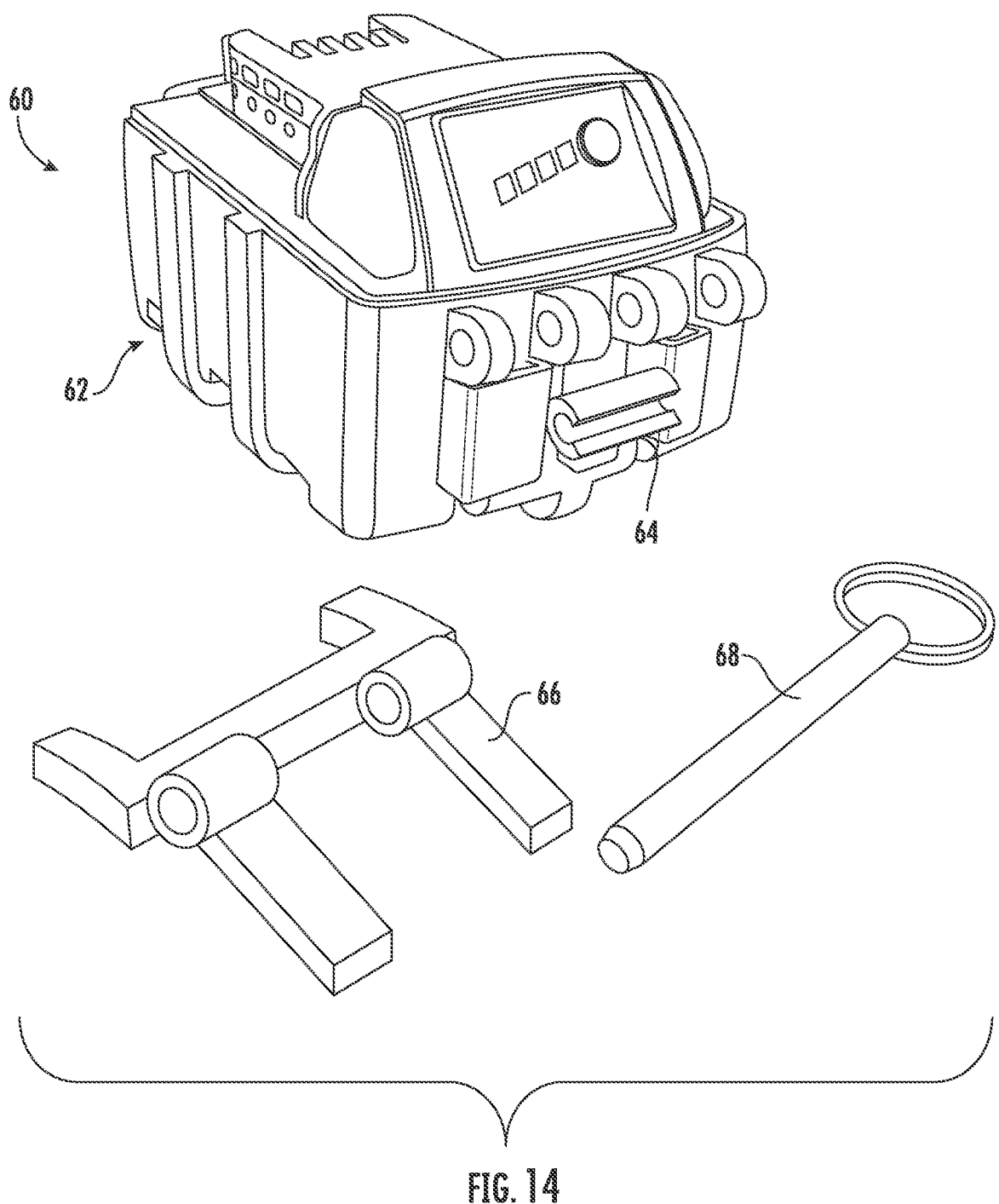
FIG. 14 is a front perspective view of the retrofit battery and sleeve of FIG. 13, showing the front arm and a cotter-pin removed, according to an exemplary embodiment.

FIG. 13 illustrates a retrofit battery 60 with a sleeve 62, shown as a battery cradle or sleeve 62, attached. Retrofit battery 60 may be the same as or similar to battery 10 described above, except that retrofit battery 60 may not have an integral tether receiver 18. In some embodiments, sleeve 62 is the same or substantially the same as bumper 24 described above. Sleeve 62 is configured to receive the retrofit battery 60 and circumscribe a portion of the retrofit battery 60. FIG. 14 illustrates the component parts that attach sleeve 62 to the retrofit battery 60. FIGS. 13 and 14 illustrate a retrofit battery 60. Retrofit battery 60 may fit within sleeve 62 to provide a tether receiver, shown as retrofit tether receiver 64, to attach tether 50. As illustrated, sleeve 62 includes retrofit tether receiver 64 and a clasp or front arm 66 attached to the sleeve 62 with a pin 68 that overlays and constrains retrofit battery 60.

The clasp or front arm 66 secures sleeve 62 to the battery and overlays a portion of retrofit battery 60 within the sleeve 62. Front arm 66 can move from an open position to a closed position. For example, front arm 66 can rotate about pin 68 to an open or closed position or may be opened by removing pin 68. In the open position, retrofit battery 60 can be removed and replaced within sleeve 62. In the closed position, front arm 66 constrains retrofit battery 60 and prevents accidental removal of retrofit battery 60 from sleeve 62. Sleeve 62 and/or front arm 66 confine retrofit battery 60 to provide a retrofit tether receiver 64 for tether 50 attachment to the retrofit battery 60. Sleeve 62 and/or front arm 66 can include loops, hooks, cavities, openings 36, quick tether attachments, and/or other attachment locations. Tethering sleeve 62 ensures the coupled retrofit battery 60 is secured to a tether 50. In some embodiments, the pin 68 constrains the front arm 66 and forms a retrofit tether receiver 64, e.g., for attachment of tether 50 to pin 68.

Figure 15A:
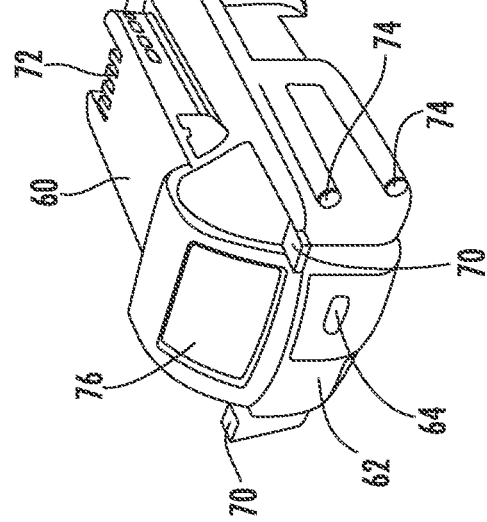
FIG. 15A is a front perspective view of a small sized retrofit battery with an attached sleeve, according to an exemplary embodiment.
Figure 15B:
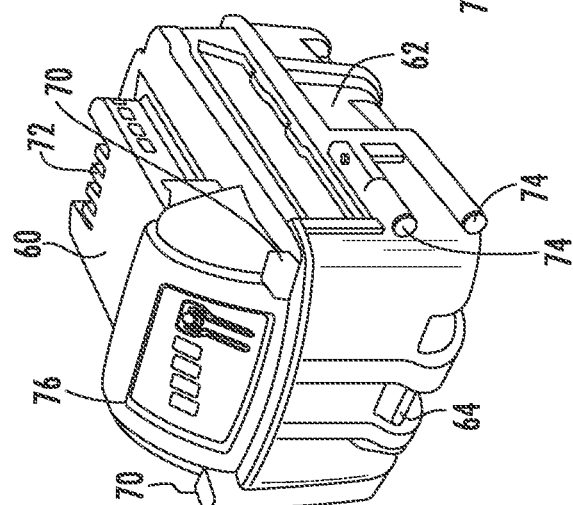
FIG. 15B is a front perspective view of a medium sized retrofit battery with an attached sleeve, according to an exemplary embodiment.
Figure 15C:
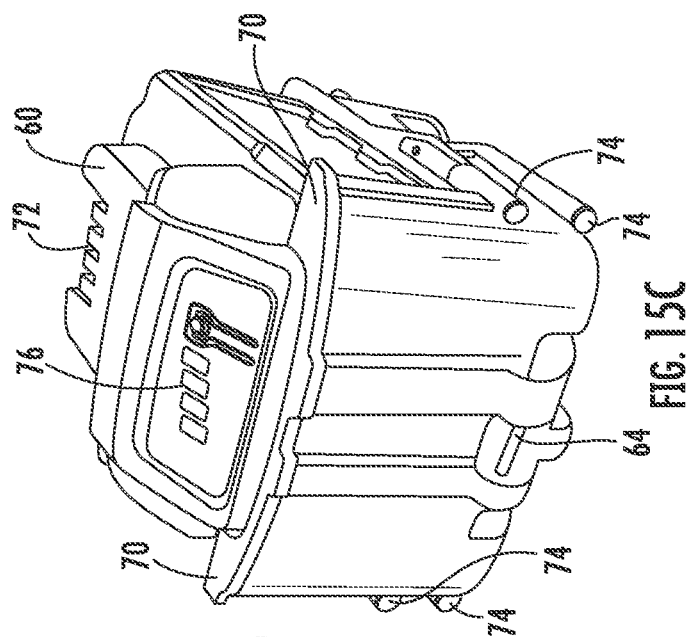
FIG. 15C is a front perspective view of a large sized retrofit battery with an attached sleeve, according to an exemplary embodiment.

FIGS. 15A-C illustrate one embodiment of an attached or coupled sleeve 62. FIG. 15A illustrates a comparatively small retrofit battery 60 with secured sleeve 62. As illustrated, securing protrusions 70 or protrusions overlap a portion of retrofit battery 60 and ensure that sleeve 62 encloses at least a portion of retrofit battery 60, based on the retrofit battery 60 size. For example, sleeve 62 includes securing protrusions 70 that attach to a top surface of retrofit battery 60 to secure a retrofit tether receiver 64 on retrofit battery 60 without interfering with power tool receiver 72 or other retrofit battery 60 components (e.g., status indicator 76). In some embodiments, sleeve 62 may comprise two or more parts secured together via screws 74, or another securing mechanism. For example, clips 48, bolts, snaps, hook-and-loop fasteners, or other attachments may secure one part of the sleeve 62 to another part. In some embodiments, an operator may tighten or loosen screws 74, thus securing or loosening the sleeve 62, but may not remove the screws 74 from the sleeve 62. In some embodiments, the screws 74 are designed to be hand fastened, so that no tools are required to secure sleeve 62 to retrofit battery 60. In some embodiments, sleeve 62 is an integrated single component that is stretched over retrofit battery 60 so that no fasteners or attachments are required to fit sleeve 62 to retrofit battery 60.

FIG. 15B illustrates a second embodiment of a sleeve 62 configured to house a medium sized retrofit battery 60. The sleeve 62 of FIG. 15B may be similar to the sleeve 62 of FIG. 15A except the sleeve 62 of FIG. 15B is configured for a medium sized retrofit battery 60. Similar to the embodiment of FIG. 15A, the sleeve 62 include securing protrusions 70 and screws 74 to attach a retrofit tether receiver 64 to the medium sized retrofit battery 60. Sleeve 62 may be a single integrated part or may include two or more component parts joined, assembled, or tightened by screws 74.

FIG. 15C illustrates a third embodiment of a sleeve 62 for a large retrofit battery 60. FIG. 15C may be similar to the sleeve 62 of FIGS. 15A-B, except the sleeve 62 of FIG. 15C is configured for a large retrofit battery 60. Similar to the embodiments of FIGS. 15A and B, sleeve 62 includes securing protrusions 70 and screws 74 that attach the retrofit tether receiver 64 to the large sized retrofit battery 60. FIGS. 15A-C illustrate two main functions of sleeve 62 for all sized batteries: (1) to protect the retrofit battery 60 and (2) to provide a retrofit tether receiver 64 to the housing assembly 12. Sleeve 62 of FIGS. 15A-C can be the same as or substantially similar to bumper 24 as described above. As illustrated in FIGS. A-C, retrofit tether receivers 64 disposed on sleeve 62 can include attachment locations for loops, hooks, clips 48, carabiners, hook-and-loop fasteners, quick release tethers (e.g., as described in detail below), and/or other attachments.

Figure 16:
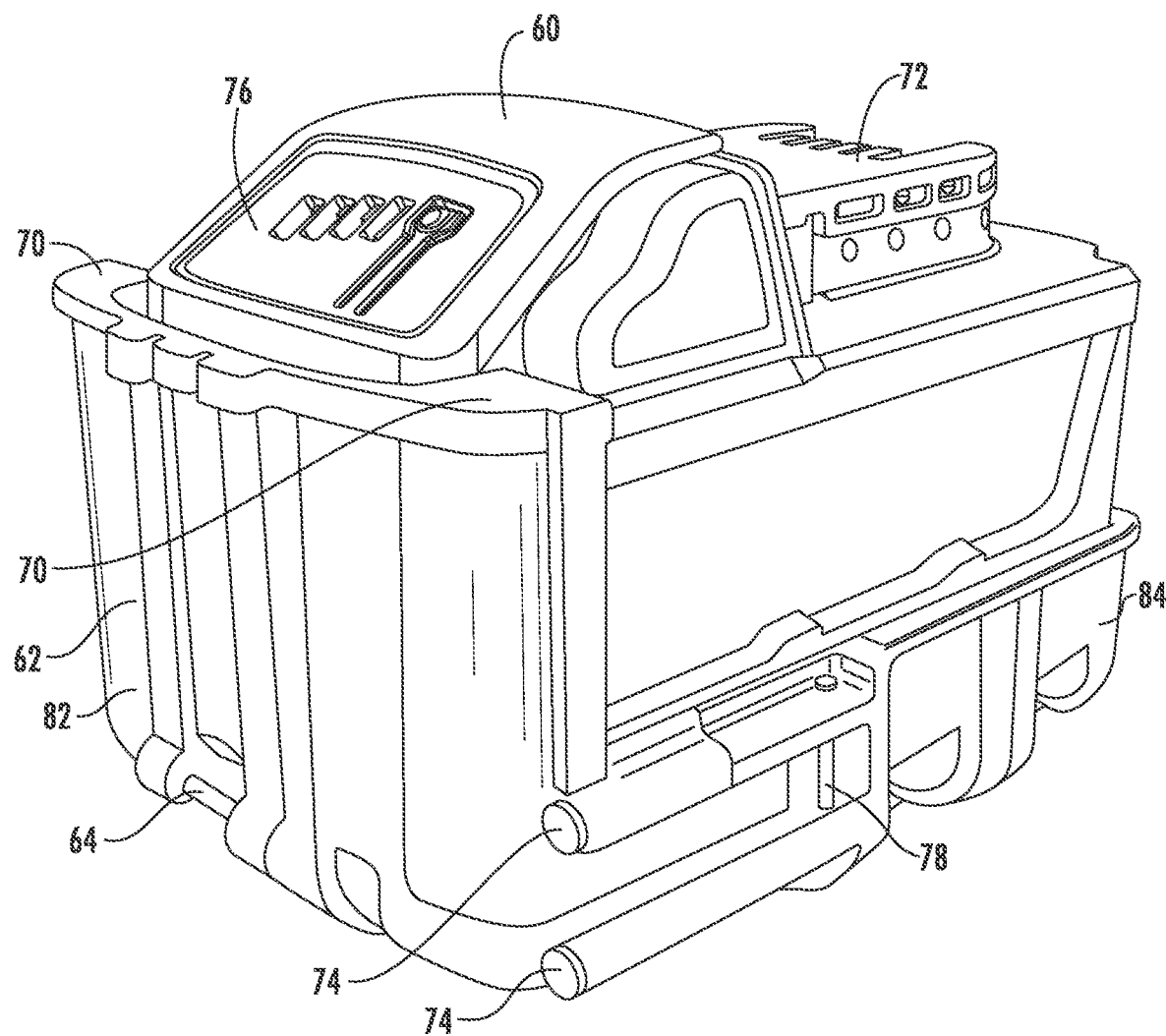
FIG. 16 is a detailed perspective view of a retrofit battery inside a sleeve, highlighting the location of securing tabs and sleeve screws encasing the retrofit battery within the sleeve, according to an exemplary embodiment.
Figure 17:
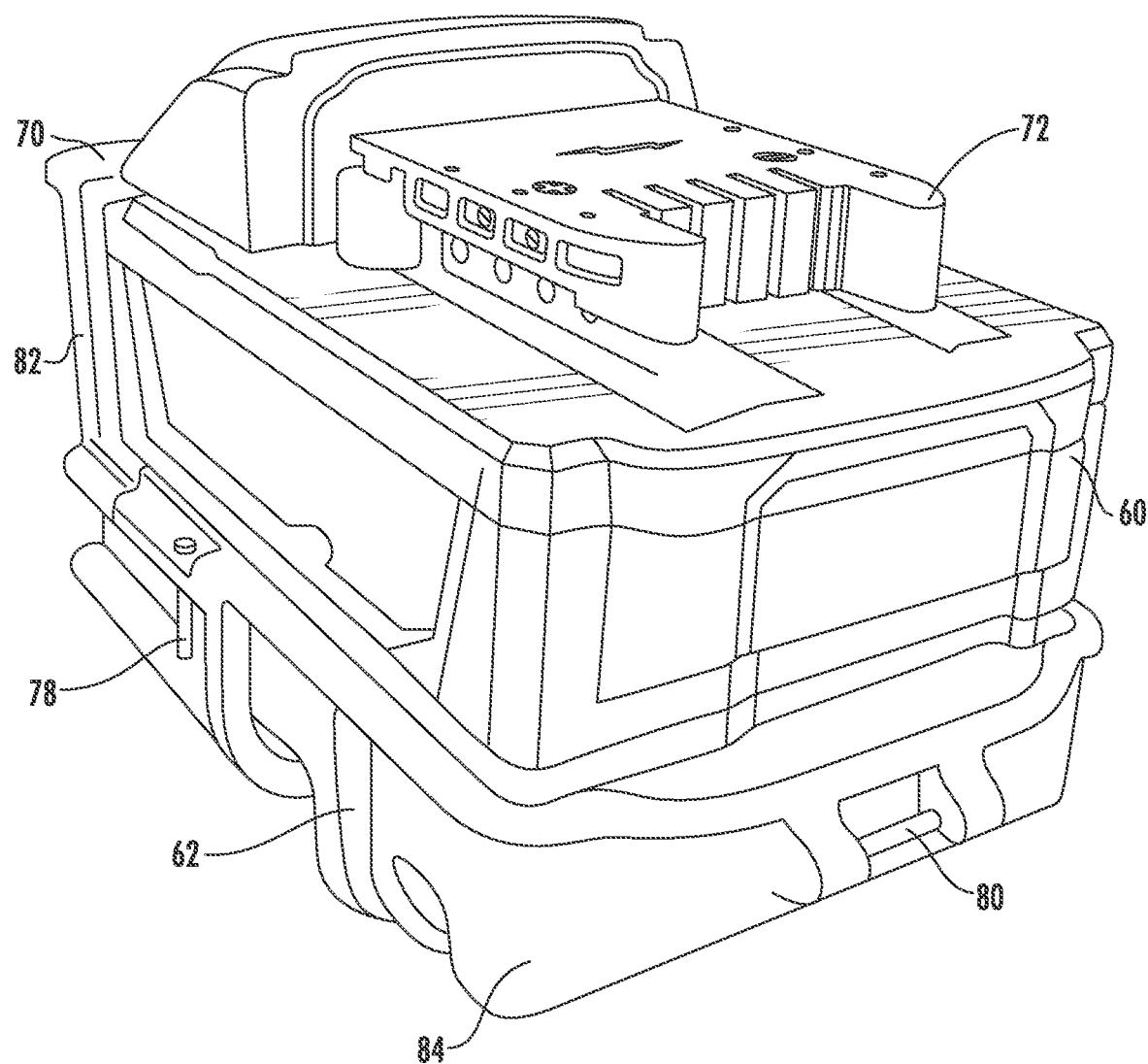
FIG. 17 is a rear perspective view of the retrofit battery of FIG. 16 encased by the sleeve, according to an exemplary embodiment.

FIG. 16 is a front prospective view of retrofit battery 60 with attached sleeve 62. From this perspective, screws 74 are shown to attach, fasten, and/or tighten a front part 82 of sleeve 62 to a rear part 84 of sleeve 62. Sleeve 62 has a front part 82 coupled to a rear part 84 at or relative to the vertical axis of housing assembly 12. For example, front part 82 may couple to rear part 84 at the vertical axis or at or more than ⅓, ½, or ⅔ of the distance between the vertical axis and a front or rear of housing assembly 12. As illustrated, a second or side tether receiver 78 attachment may be included on a side of sleeve 62. In some embodiments, sleeve 62 may have one or more side tether receivers 78 on either or both sides. FIG. 17 illustrates a rear tether receiver 80 providing another location to attach a lanyard or tether 50 to the sleeve 62.

FIG. 18 illustrates three embodiments of a screw 74 or tab 86 that creates a joint configured to attach a tether receiver to a slot 88 (e.g., in a Milwaukee Tool M12 battery). There is a slot 88 in the retrofit battery 60 housing assembly 12 that allows screws 74 and/or securing tabs 86 to move along slot 88 and lock in a friction fit within slot 88. Slots 88 cooperate with the power tool receiver 90 to couple to a power tool and permit access for securing tabs 86 or screws 74 to secure a sleeve 62 to retrofit battery 60. In the illustrated embodiment, the sleeve 62 sits on the bottom or a base of retrofit battery 60. The sleeve 62 is secured by sliding a screw 74 or tab 86 through slot 88 into a locking position within the slot 88. Sleeve 62 includes a retrofit tether receiver 64 (e.g., on the bottom or base) and provides an attachment location for a tether 50. Sleeve 62 can be configured to fit on other retrofit batteries 60. In this way, sleeve 62 can add a tether receiver 64 to a battery with limited access when the retrofit power tool receiver 94 is inserted into a tool.

Intermediary Tether Adapters Connected to the Power Tool Receiver

FIG. 19 illustrates another embodiment for connecting a tether receiver 64 to a retrofit battery 60. In some embodiments, a tether receiver 64 can be coupled to a retrofit battery 60 at the power tool receiver 72 of the housing assembly 12. For example, an intermediary structure, or intermediary tether adapter 92 can connect to the power tool receiver 72 of the retrofit battery 60 to provide a tether receiver 64 and communicate electrical power to a power tool or device. In this way, secure attachment of the intermediary tether adapter 92 to the power tool receiver 72 of the housing assembly 12 ensures that the tether receiver 64 provides a secure tether attachment point to secure the retrofit battery 60.

Intermediary tether adapter 92 can connect directly to power tool receiver 72 and transmit the electrical power to the tool. This enables the intermediary tether adapter 92 to securely attach a retrofit tether receiver 64 to the power tool receiver 72. The battery-power tool engagement system at the power tool receiver 72 provides a secure location to attach a retrofit tether receiver 64 and attach a tether 50 to the retrofit battery 60. Intermediary tether adapter 92 includes a second or retrofit power tool receiver 94 to attach the power tool to the intermediary structure. The intermediary tether adapter 92 communicates electrical power from the retrofit battery 60 at the first power tool receiver 72 to the retrofit power tool receiver 94 attached to the power tool or device. As illustrated in FIGS. 19-21 (e.g., with reference to a Milwaukee Tool M18 battery platform), intermediary tether adapter 92 can connect or disconnect from retrofit battery 60 in the same way as a power tool. Using the intermediary tether adapter 92 as an intermediary between the retrofit battery 60 and the power tool enables the transmission of electrical power to the power tool while securing a tether location to the retrofit battery 60.

FIGS. 20A-C illustrate the process of engaging an intermediary tether adapter 92 to a retrofit battery 60, according to one embodiment. FIG. 20A shows an intermediary tether adapter 92 sliding onto the power tool receiver 72 (covered and not shown) of the retrofit battery 60. As the intermediary tether adapter 92 is slid onto the power tool receiver 72, the gap between the adapter and the battery decreases as illustrated from FIG. 20A to FIG. 20B. Intermediary tether adapter 92 locks onto the power tool receiver 72 of retrofit battery 60. Front arm 66 can rotate down to lock the intermediary tether adapter 92 onto retrofit battery 60, as illustrated in FIG. 20C. Intermediary tether adapter 92 can lock on retrofit battery 60 to provide a retrofit tether receiver 64 and communicate power to the retrofit power tool receiver 94.

Figure 21A:
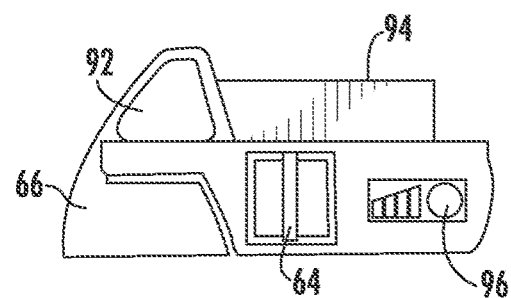
FIG. 21A illustrates an intermediary tether adapter that locks onto the power tool receiver of a retrofit battery and tethers the battery at a tether receiver when the tool and battery are joined, according to an exemplary embodiment.
Figure 21B:
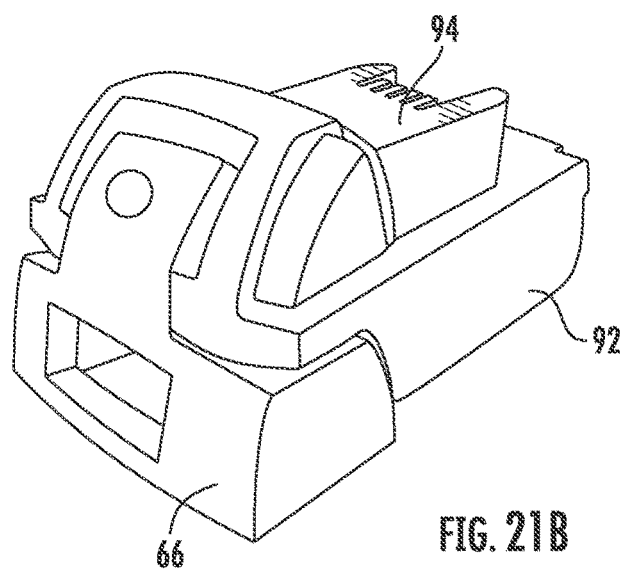
FIG. 21B illustrates a perspective view of the tether receiver of FIG. 21A that attaches to the power tool receiver of the battery, according to an exemplary embodiment.
Figure 21C:
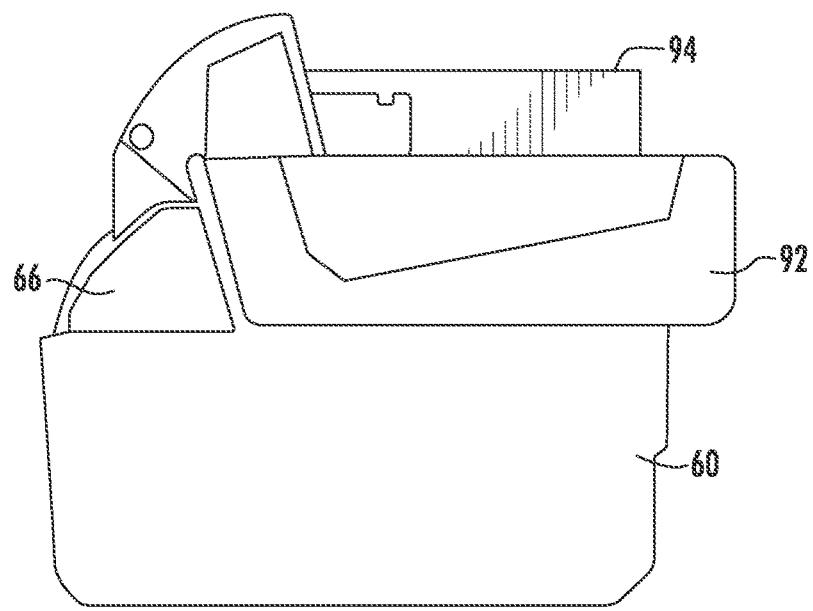
FIG. 21C illustrates the intermediary tether adapter of FIG. 21 A and B that locks onto the power tool receiver of a battery in a closed position on the battery, according to an exemplary embodiment.

FIGS. 21A-C illustrate different views of another embodiment of an intermediary tether adapter 92 installed on a retrofit battery 60. The intermediary tether adapter 92 body slides onto the rails of an engagement system of power tool receiver 72. When secured, the locking device on the intermediary tether adapter 92 is engaged. A hinged front arm 66 is pressed down against the front of the retrofit battery 60 to lock the device and prevent the hinged front arm 66 from opening. Front arm 66 prevents the intermediary tether adapter 92 from sliding off retrofit battery 60. Intermediary tether adapter 92 can be configured to connect to the engagement system of any power tool receiver 72 or housing assembly 12.

Tether-Battery Attachment System

Figure 22:
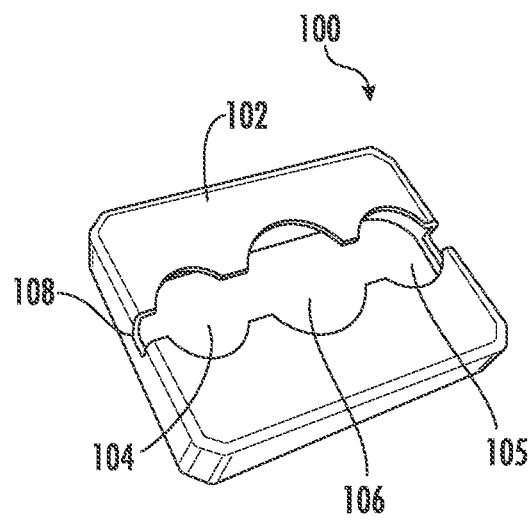
FIG. 22 is a perspective view of a tether attachment structure that can be attached to a battery, according to an exemplary embodiment.
Figure 23:
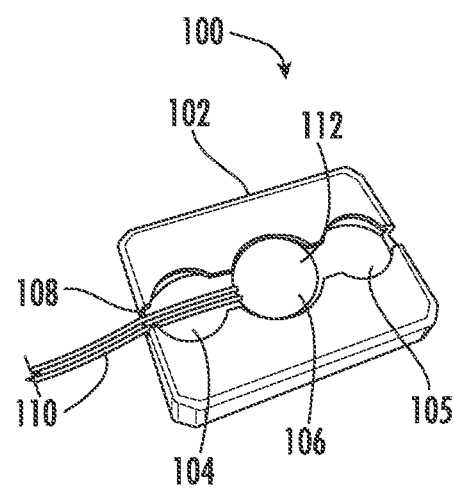
FIG. 23 is a perspective view of the tether attachment structure of FIG. 12 showing receipt of a tether end through a center hole, according to an exemplary embodiment.
Figure 24:
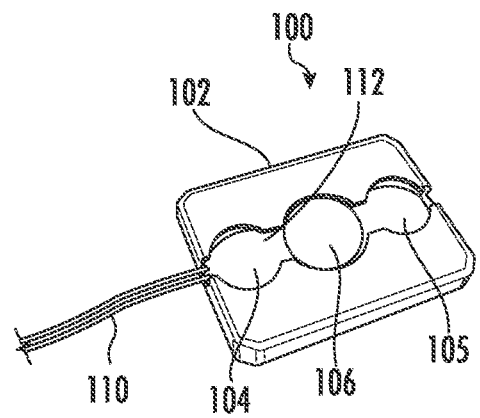
FIG. 24 is a perspective view of the tether base of FIG. 12 showing the tether end locked into a first locking hole of the tether attachment structure, according to an exemplary embodiment.

FIGS. 22-24 illustrate a quick-connect tether-battery attachment system 100 with tether attachment structure 102. Tether attachment structure includes an insertion slot 106 connected to locking locations or locking pockets 104 and 105 via a channel. Tether attachment structure 102 may be integral with battery housing or may be attached or coupled to the battery housing. Tether attachment structure 102 can attach to a battery housing assembly 12, a bumper 24, a battery sleeve 62, an intermediary tether adapter 92, or a battery 10, 60 housing assembly 12 (e.g., a battery base). For example, tether attachment structure 102 may be the same or similar to bumper 24 or sleeve 62, described above. In some embodiments, tether attachment structure 102 is integral with housing assembly 12, bumper 24, sleeve 62, intermediary tether adapter 92 or other battery components. In other embodiments, tether attachment structure 102 is a separate component part coupled to one or more of these components.

The tether attachment structure 102 may include a large centeral hole diameter, or insertion slot 106, and two or more locking pockets 104. In some embodiments, insertion slot 106 is in the center of the tether attachment structure 102 (as shown). The large central hole diameter hole is referred to as an insertion slot 106 though other configurations are possible (e.g., locating the insertion slot 106 away from the center).

Insertion slot 106 has a channel that communicates with the locking pockets 104 and 105 to receive a tether key 112. When the tether battery attachment structure 102 attaches to a battery, the holes provide quick access for a tether 110 and a tether key 112 to fit into the battery attachment structure 102. The channel allows tether key 112 to move from the insertion slot 106 through the channel and to one of the two or more locking pockets 104 and 105. The biasing element on the tether key 112 creates a friction fit that secures the tether key 112 in the locking pocket 104 or 105. Although described herein as a separate structure, it is to be understood that the battery housing assembly 12, bumper 24, battery sleeve 62, and/or the intermediary tether adapter 92 can incorporate the features of the battery attachment structure 102, described in detail below.

FIG. 22 shows a quick-connect tether-battery attachment system 100 for insertion of a tether end or tether key 112 into one of two smaller locking pockets 104 and 105. The tether attachment system 100 includes an outer surface coupled to the battery and a second outer surface that opens to define the channel with the locking pockets 104 and 105 and insertion slot 106. Once inserted into insertion slot 106 and slid into the locking pocket 104 or 105, the battery is secured to tether 110 through a friction fit (e.g., as illustrated in FIGS. 23-24). FIG. 22 includes two locking pockets 104 and 105 to tether a battery for replacement at overhead locations. As shown, locking pockets 104 and 105 are located at the edge of the tether attachment structure 102 and have a smaller diameter than the insertion slot 106. The channel includes a first end with a first locking pocket 104 and a second end with a second locking pocket 105. In some embodiments, the first locking pocket 104 secures a first tether key 112 to the battery and a second locking pocket 105 secures a second tether key 112 to the battery.

The insertion slot 106 is larger (e.g., has a larger diameter) than the locking pockets 104 and 105 to accept the tether key 112 into the hole. Tether key 112 has a large center diameter 120 that creates a friction fit in the locking pockets 104 and 105. The large center diameter 120 slides through the insertion slot 106 through the channel and under and into the locked pockets 104 and 105. The large center diameter 120 of tether key 112 restrains the tether 110 in the locking pocket 104 or 105 through a friction fit with the upper surface of the tether attachment structure 102. As described below, a biasing member 122 may be used to create the friction fit that prevents the tether key 112 from slipping out of the locking pocket 104 and into the insertion slot 106.

FIG. 23 illustrates the quick-connect tether-battery attachment system 100 in use with tether 110. The tether attachment structure 102 includes three holes: an insertion slot 106, and two locking pockets 104 and 105. The tether key 112 is secured by sliding the key 112 through the insertion slot 106 of the tether attachment structure 102 and locking the key 112 with a friction fit in one of the two locking pockets 104 or 105. Tether key 112 is inserted into the tether attachment structure 102 at the insertion slot 106. The lanyard or tether key 112 has a larger central portion that fits in the insertion slot 106 but is too narrow to slide out of the smaller diameter of the locking pockets 104 and 105 on either side of the insertion slot 106. The tether key 112 has a biasing element that creates a friction fit against the upper surface of the smaller diameter locking pockets 104 and 105. Tether attachment structure 102 includes a slot 108 for the tether 110 to exit the tether attachment structure 102 when the tether key 112 is constrained in a locking pocket 104 or 105 and ensures that tether key 112 is tightly secured.

FIG. 24 illustrates tether attachment structure 102 of FIGS. 22 and 23 where tether key 112 is locked into a first locking pocket 104. As shown in FIG. 24, a second locking pocket 105 remains available for a second tether key 112 (not shown). Access to this second locking pocket 105 is advantageous when the battery is being replaced, or when the battery is needed for a different tool. The tether attachment structure 102 enables quick connection of one or two tether keys 112 (e.g., at locking pockets 104 and 105). This process enables the battery to be secured to the lanyard or tether 110 during operation and secured to a storage lanyard when depleted. Similarly, the operator can bring a charged battery and store it using one of the locking pockets 104 or 105. When the battery is deployed for operation, the additional tether 110 can attach tether attachment structure 102 to the power tool tether 110. This process ensures that at least one tether 110 remains secured to the battery at all times.

Figure 25:
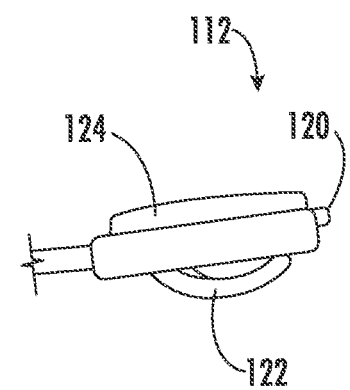
FIG. 25 is a detailed view of a tether end, according to an exemplary embodiment.

FIG. 25 illustrates the tether end or tether key 112 of a tether 110 where a large center diameter 120 of tether key 112 can be inserted into tether attachment system 102 of FIGS. 22-24. Tether key 112 includes a biasing element, illustrated as biasing member 122. Tether keys 112 have a large center diameter 120 that enables insertion into insertion slots 106 of the tether attachment structure 102 but induces a friction fit in the locking pockets 104 and 105. The large center diameter 120 is too large to slip out of the locking pockets 104 and 105 located on the sides of the tether attachment system 100. The top surface 124 of the tether key 112 may have a smaller diameter than the large center diameter 120. This shape may enable the locking pockets 104 and 105 to engage the tether key 112 and secure the tether 110 to the base of the tether attachment structure 102. A variety of shapes can be used to implement this design, which is not limited to the configuration shown. For example, the cross-sectional shape of the tether key 112 could be a triangle, parallelogram, an octagon, or any other shape, so long as the locking pockets 104 and 105 of tether attachment system 100 are configured to receive the tether key 112. This "lock and key" configuration (e.g., locking pockets 104 and 105 and tether key 112) between the tether attachment structure 102 and tether key 112 allows for the development of a wide variety of unique tether key 112 and tether attachment structure 102 shape configurations.

FIG. 25 illustrates biasing member 122 located underneath the tether key 112 that secures the tether key 112 against the upper inner surface of the tether attachment structure 102. The biasing member 122 may be a loop of resilient material that pushes the tether key 112 into a friction fit in locking pocket 104 or 105. Biasing member 122 creates a frictional force that secures the tether key 112 in a locked position within locking pockets 104 or 105. The biasing member 122 also prevents tether key 112 from dislocating out of the designed locking pocket 104 and 105 locations.

To disengage the locking mechanism, an operator compresses the tether key 112 (e.g., pushes the tether key 112 down) and slides the key 112 back to the insertion slot 106. In this location, the insertion slot 106 is too large to restrain the large center diameter 120 of the tether key 112. Biasing member 122 pushes tether key 112 through insertion slot 106 and releases the tether key 112.

Figure 26:
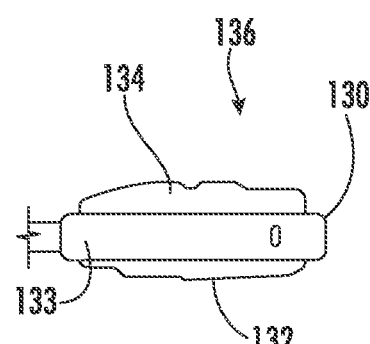
FIG. 26 is a detailed view of a tether end, according to another exemplary embodiment.

FIG. 26 illustrates another embodiment of a tether end or tether key 136. Tether key 136 is substantially the same as tether key 112, except for the differences discussed herein. In contrast to the resilient loop biasing member 122 of tether key 112, tether key 136 includes a compression spring 133 internal to tether key 136. Spring 133 biases the top surface 134 away from the bottom surface 132. When the operator pushes the top surface 134 of the tether key 136, the spring 133 compresses, and the height of the tether key 136 reduces. The compressed tether key 136 allows the large center diameter 130 section to slide from the insertion slot 106 into the locking pocket 104 or 105. When the operator releases the compressed spring 133 of tether key 136 in locking pocket 104 or 105, the spring 133 secures the tether key 136 against the upper inner surface of the tether attachment structure 102 creating a friction fit. Tether attachment structure 102 may include battery housing assembly 12, bumper 24, battery sleeve 62, intermediary tether adapter 92, or the battery sides, top, or base. Top surface 134 and bottom surface 132 expand in locking pocket 104 or 105 to engage large center diameter 130 with the upper surface of the locking pocket 104 or 105.

Figure 27:
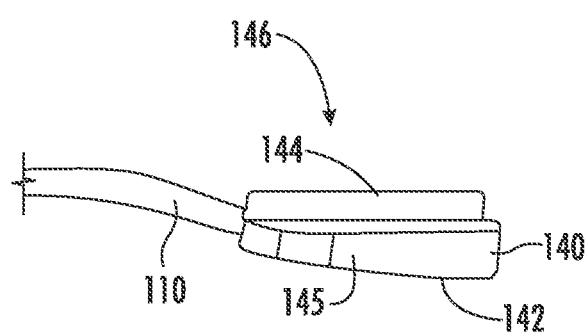
FIG. 27 is a detailed view of a tether end, according to another exemplary embodiment.

FIG. 27 illustrates an embodiment of a tether end or tether key 146 for insertion into tether attachment system 102. In this embodiment, top surface 144 connects to bottom surface 145 of the tether key 146 at a biased angle (e.g., biased member 142 creates an angle between top surface 144 and bottom surface 145). The angled surfaces create the biased member 142 of tether key 146. The bottom surface 145 rotates about an angle with respect to top surface 144 and the biasing member 142 causes rotation of the bottom surface 145 relative to top surface 144 that generates the friction fit in locking pocket 104 or 105. As the operator compresses the top surface 144 towards the bottom surface 145, the angle between the surfaces goes to zero, and the compressed tether key 146 can slide into the locking pocket 104 or 105. This configuration is similar to that in FIG. 26, except that the surfaces are rotated through a pivot. Similar to FIG. 26, the friction fit causes the biasing member 142 to secure the tether key 146 in the locked pocket 104 or 105. Biased member 142 serves as the bottom surface 145 and has a large center diameter 140. Thus bottom surface 145 has a large center diameter 140 than top surface 144, allowing biasing member 142 to lock with a friction fit into locking pocket 104 or 105.

Figure 28:
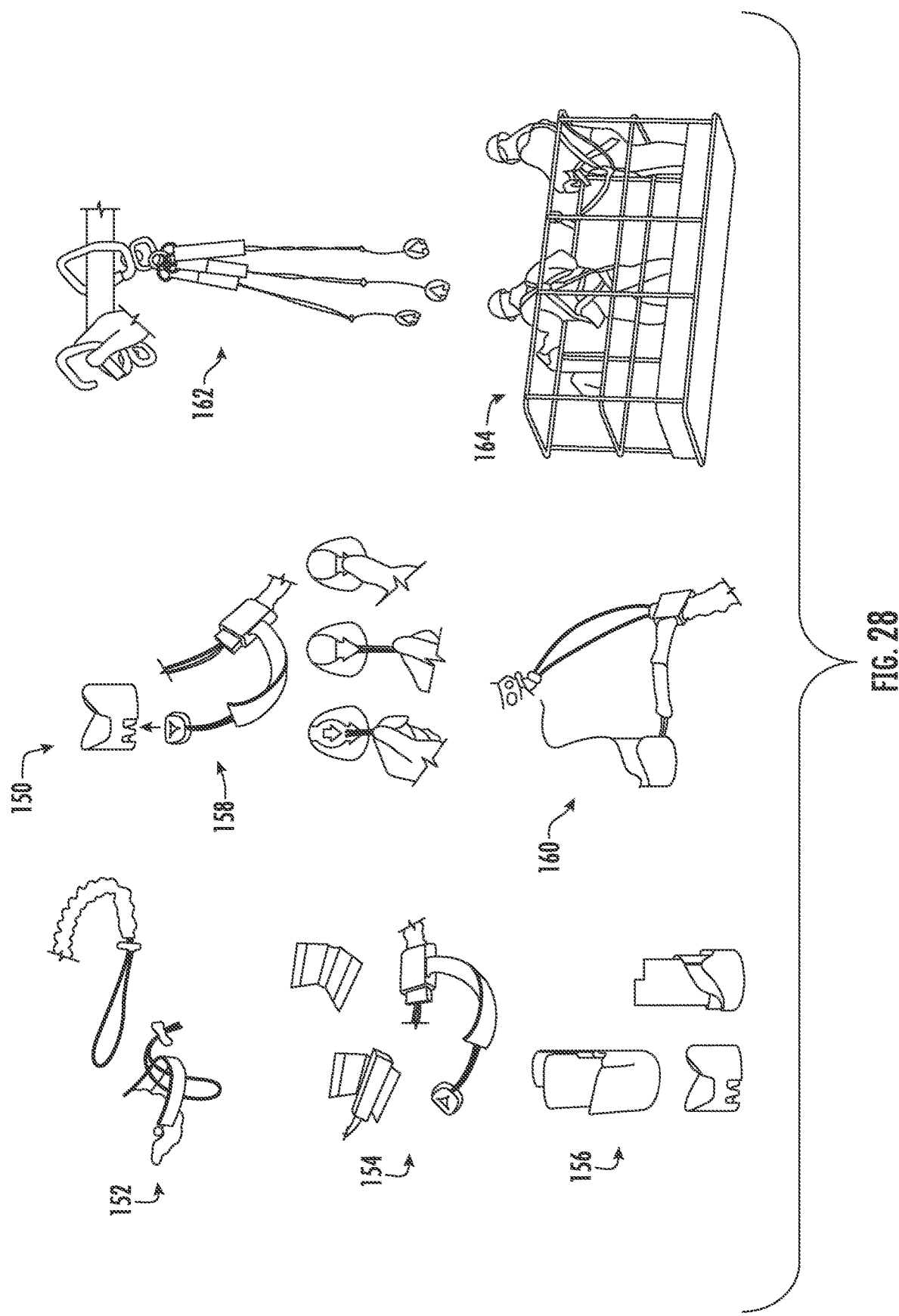
FIG. 28 shows the steps of a process of tethering the battery sleeve to a battery housing and using quick attachment battery tethers to attach to the battery in an overhead working environment, according to an exemplary embodiment.

FIG. 28 illustrates a method 150 of battery attachment for an embodiment of a battery tether attachment system 100. In some embodiments, FIG. 28 is a process of tethering the battery housing assembly 12 or sleeve 62 using the quick attachment tethers 110 in an overhead working environment. With reference to FIGS. 1-28, the first step 152 involves selecting the appropriate tether 50, 110 weight (for convenience "tether 50") based on the size and weight of the battery 10, 60 (for convenience "battery 10"). The second step 154 attaches a clip 48, such as a clasp, to secure the battery 10 to the tool tether 50. For example, battery 10 may use a first locking pocket 104 of a tether attachment structure 102. In the third step 156, the operator selects the appropriate sleeve 62 (e.g., housing assembly 12, tether receiver 18, 64, bumper 24, protrusion 28, sleeve 62, or intermediary tether adapter 92) for the battery 10.

In the fourth step 158, the operator secures the tether 50 to the battery sleeve 62. For example, tether key 112, 136,146 (for convenience "key 112") is pushed into sleeve 62 securing the battery 10. Key 112 may be biased to secure the key 112 in the locked position when the operator slides key 112 into the locking pocket 104. In the fifth step 160, the operator ensures that the tool is tethered to the lanyard and the battery key 112 is attached to sleeve 62. In the sixth step 162, a storage carabiner to store charged batteries and exchange depleted batteries at height is attached to the rail of the boom. In the seventh step 164, the operator uses the tethered tools and battery.

To release the tether key 112 when the operator returns to ground, the operator pushes down on the tether key 112, pulls back, and releases the tether key 112 from sleeve 62. This process ensures that the tool is secured to tether 50, and a battery key 112 is attached to the battery 10 or sleeve 62. The tethers 50 can attach to the rail of the boom, e.g., through a carabiner or other securing device. This process enables independent tethering of tools and batteries during overhead operations and ensures compliance with safety rules and regulations.

FIG. 29 shows various images related to tethering batteries. A battery 172 is connected to a battery tether 174. The battery tether 174 may be secured to a tool tether 176. The tool tether 176 is tethered to a power tool, and the battery tether 174 attaches to the battery 172. The battery 172 may always be tethered either to the battery tether 174 on the tool tether 176 or to a storage tether 178. The button 180 at the end of the battery tether 174 may engage a springed/biased slot 182 of the tether attachment structure.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions and arrangement of the various exemplary embodiments without departing from the scope of the present invention.

What is claimed is:

1. A power tool battery, comprising:
   a housing comprising:
   an upper housing;

a lower housing, the lower housing configured to be coupled to the upper housing, wherein interior surfaces at the lower housing and upper housing define a cavity when the lower housing and upper housing are coupled together;

a battery cell located in the cavity;

a vertical axis through a midpoint of the housing;

a horizontal axis through a midpoint of the housing;

a plane containing both the vertical axis and the horizontal axis, the plane dividing the housing into a first side and a second side;

a tool receiver including an electrical contact, the electrical contact located entirely on the first side of the housing, the tool receiver configured to receive a tool power by the battery; and a tether receiver formed on the battery and located entirely on the second side opposite the tool receiver;

wherein the tether receiver comprises an upper portion integrally formed and contiguous with the upper housing and a lower portion integrally formed and contiguous with the lower housing, wherein the upper portion of the tether receiver is coupled to the lower portion of the tether receiver when the upper portion of the housing is coupled to the lower portion of the housing.

2. The power tool battery of claim 1, wherein the tether receiver is located at least partially within a footprint of the outer housing.

3. The power tool battery of claim 1, wherein the tether receiver is located at least partially outside the perimeter of the housing walls.

4. The power tool battery of claim 1, wherein the upper housing is made from a different material than the lower housing.

5. The power tool battery of claim 1, wherein the housing includes a frame that secures the upper housing to the lower housing and that secures a lithium ion cell within the housing.

6. The power tool battery of claim 1, further comprising a power indicator that displays the amount of power available in the battery.

7. The power tool battery of claim 1, further comprising a bumper formed from a layer of resilient material, the bumper connected to a base of the housing to protect the housing, the bumper comprising a tether receiver.

* * * * *